(12) United States Patent
Johnson, Jr.

(10) Patent No.: US 10,134,425 B1
(45) Date of Patent: Nov. 20, 2018

(54) DIRECTION-BASED SPEECH ENDPOINTING

(71) Applicant: Amazon Technologies, Inc., Seattle, WA (US)

(72) Inventor: Charles Melvin Johnson, Jr., Hudson, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/753,828

(22) Filed: Jun. 29, 2015

(51) Int. Cl.
| | | |
|---|---|---|
| *G10L 15/22* | (2006.01) | |
| *G10L 15/18* | (2013.01) | |
| *G10L 15/26* | (2006.01) | |
| *G10L 15/183* | (2013.01) | |
| *G10L 25/78* | (2013.01) | |
| *G10L 25/87* | (2013.01) | |
| *G10L 25/93* | (2013.01) | |

(52) U.S. Cl.
CPC ............ *G10L 25/78* (2013.01); *G10L 15/183* (2013.01); *G10L 15/22* (2013.01); *G10L 15/26* (2013.01); *G10L 25/87* (2013.01); *G10L 25/93* (2013.01)

(58) Field of Classification Search
CPC . G06F 17/289; G06F 17/2785; G10L 15/265; G10L 15/16; G10L 15/02; G10L 15/20; G10L 15/22; G10L 15/08; G10L 15/142; G10L 15/063; G10L 25/78; G10L 25/87; G10L 13/08
See application file for complete search history.

(56) References Cited

U.S. PATENT DOCUMENTS

| | | | | | |
|---|---|---|---|---|---|
| 4,319,085 A | * | 3/1982 | Welch | ............ | G10L 25/87 704/237 |
| 4,336,421 A | * | 6/1982 | Welch | ............ | G10L 15/05 704/243 |
| 4,370,521 A | * | 1/1983 | Johnston | ............ | G10L 25/87 704/233 |
| 4,718,097 A | * | 1/1988 | Uenoyama | ............ | G10L 25/87 324/76.31 |
| 5,444,817 A | * | 8/1995 | Takizawa | ............ | G10L 15/04 704/238 |
| 5,465,317 A | * | 11/1995 | Epstein | ............ | G10L 25/78 704/236 |
| 5,621,859 A | * | 4/1997 | Schwartz | ............ | G10L 15/142 704/256 |
| 5,740,318 A | * | 4/1998 | Naito | ............ | G10L 25/87 704/248 |

(Continued)

OTHER PUBLICATIONS

Co-pending U.S. Appl. No. 13/775,954, filed Feb. 25, 2013.

(Continued)

*Primary Examiner* — Anne L Thomas-Homescu
(74) *Attorney, Agent, or Firm* — Pierce Atwood LLP

(57) ABSTRACT

A system for determining an endpoint of an utterance during automatic speech recognition (ASR) processing that accounts for the direction and duration of the incoming speech. Beamformers of the ASR system may identify a source direction of the audio. The system may track the duration speech has been received from that source direction so that if speech is detected in another direction, the original source speech may be weighted differently for purposes of determining an endpoint of the utterance. Speech from a new direction may be discarded or treated like non-speech for purposes of determining an endpoint of speech from an original direction.

29 Claims, 19 Drawing Sheets

(56) References Cited

U.S. PATENT DOCUMENTS

| | | | | |
|---|---|---|---|---|
| 5,956,675 A * | 9/1999 | Setlur | G10L 15/05 | 704/231 |
| 5,995,930 A * | 11/1999 | Hab-Umbach | G10L 15/187 | 704/245 |
| 6,076,056 A * | 6/2000 | Huang | G10L 15/08 | 704/254 |
| 6,092,044 A * | 7/2000 | Baker | G10L 15/063 | 704/254 |
| 6,138,095 A * | 10/2000 | Gupta | G10L 15/08 | 704/233 |
| 6,163,768 A * | 12/2000 | Sherwood | G10L 15/063 | 704/235 |
| 6,167,377 A * | 12/2000 | Gillick | G10L 15/063 | 704/240 |
| 6,324,509 B1 * | 11/2001 | Bi | G10L 25/87 | 704/233 |
| 6,374,219 B1 * | 4/2002 | Jiang | G10L 15/05 | 704/251 |
| 6,411,925 B1 * | 6/2002 | Keiller | G10L 15/20 | 704/200 |
| 6,421,640 B1 * | 7/2002 | Dolfing | G10L 15/10 | 704/231 |
| 6,484,141 B1 * | 11/2002 | Tomoeda | G10L 15/083 | 704/231 |
| 6,535,850 B1 * | 3/2003 | Bayya | G10L 15/07 | 704/239 |
| 6,560,575 B1 * | 5/2003 | Keiller | G10L 17/04 | 704/221 |
| 6,574,595 B1 * | 6/2003 | Mitchell | G10L 15/22 | 704/242 |
| 6,594,630 B1 * | 7/2003 | Zlokarnik | G10L 15/26 | 704/256.5 |
| 6,601,027 B1 * | 7/2003 | Wright | G06F 3/16 | 704/235 |
| 6,606,594 B1 * | 8/2003 | Sejnoha | G10L 15/05 | 704/250 |
| 6,671,669 B1 * | 12/2003 | Garudadri | G10L 15/32 | 704/255 |
| 6,735,563 B1 * | 5/2004 | Bi | G10L 15/063 | 704/241 |
| 6,826,528 B1 * | 11/2004 | Wu | G10L 25/78 | 704/204 |
| 6,839,669 B1 * | 1/2005 | Gould | G10L 15/22 | 704/246 |
| 6,873,953 B1 * | 3/2005 | Lennig | G10L 25/87 | 704/248 |
| 7,085,716 B1 * | 8/2006 | Even | G10L 15/22 | 704/235 |
| 7,120,582 B1 * | 10/2006 | Young | G10L 15/063 | 704/255 |
| 7,203,652 B1 * | 4/2007 | Heck | G10L 15/32 | 704/231 |
| 7,277,853 B1 * | 10/2007 | Bou-Ghazale | G10L 25/87 | 704/248 |
| 8,600,746 B1 * | 12/2013 | Lei | G10L 15/22 | 704/235 |
| 8,843,369 B1 * | 9/2014 | Sharifi | G10L 25/03 | 704/235 |
| 9,437,186 B1 * | 9/2016 | Liu | G10L 15/05 | |
| 9,886,968 B2 * | 2/2018 | Bou-Ghazale | G10L 25/84 | |
| 2002/0035475 A1 * | 3/2002 | Yoda | G10L 15/24 | 704/270 |
| 2002/0120443 A1 * | 8/2002 | Epstein | G10L 15/20 | 704/233 |
| 2002/0128836 A1 * | 9/2002 | Konuma | G10L 15/065 | 704/251 |
| 2002/0147581 A1 * | 10/2002 | Shriberg | G10L 25/87 | 704/207 |
| 2002/0184017 A1 * | 12/2002 | Lee | G10L 25/87 | 704/236 |
| 2003/0055639 A1 * | 3/2003 | Rees | G10L 25/78 | 704/233 |
| 2003/0125945 A1 * | 7/2003 | Doyle | G10L 15/01 | 704/246 |
| 2004/0148163 A1 * | 7/2004 | Baker | G10L 15/285 | 704/231 |
| 2004/0158464 A1 * | 8/2004 | Baker | G10L 15/083 | 704/231 |
| 2004/0158468 A1 * | 8/2004 | Baker | G10L 15/08 | 704/238 |
| 2005/0096900 A1 * | 5/2005 | Bossemeyer | G10L 17/02 | 704/219 |
| 2005/0143995 A1 * | 6/2005 | Kibkalo | G10L 15/08 | 704/242 |
| 2005/0256711 A1 * | 11/2005 | Lahti | G10L 25/87 | 704/253 |
| 2005/0273323 A1 * | 12/2005 | Inagaki | G10L 15/10 | 704/214 |
| 2006/0080099 A1 * | 4/2006 | Thomas | G10L 15/10 | 704/243 |
| 2006/0136207 A1 * | 6/2006 | Kim | G10L 15/08 | 704/249 |
| 2006/0143010 A1 * | 6/2006 | Han | G10L 15/08 | 704/254 |
| 2006/0212297 A1 * | 9/2006 | Chaudhari | G10L 25/48 | 704/278 |
| 2006/0287859 A1 * | 12/2006 | Hetherington | G10L 25/87 | 704/260 |
| 2007/0050190 A1 * | 3/2007 | Washio | G10L 15/22 | 704/249 |
| 2007/0078708 A1 * | 4/2007 | Yu | G06Q 30/02 | 705/14.69 |
| 2007/0136059 A1 * | 6/2007 | Gadbois | G10L 15/32 | 704/246 |
| 2007/0143110 A1 * | 6/2007 | Acero | G10L 15/05 | 704/251 |
| 2007/0225982 A1 * | 9/2007 | Washio | G10L 15/22 | 704/257 |
| 2007/0233471 A1 * | 10/2007 | Ariu | G06F 17/289 | 704/215 |
| 2008/0025477 A1 * | 1/2008 | Farhan | G06Q 50/22 | 379/38 |
| 2008/0040109 A1 * | 2/2008 | Muralidhar | G10L 25/87 | 704/233 |
| 2008/0046406 A1 * | 2/2008 | Seide | G06F 17/30743 | |
| 2008/0052073 A1 * | 2/2008 | Goto | G10L 15/06 | 704/251 |
| 2008/0154594 A1 * | 6/2008 | Itoh | G10L 15/04 | 704/235 |
| 2008/0195385 A1 * | 8/2008 | Pereg | G10L 17/26 | 704/231 |
| 2008/0215325 A1 * | 9/2008 | Horii | G06F 11/0709 | 704/251 |
| 2008/0235016 A1 * | 9/2008 | Paul | G06N 99/005 | 704/246 |
| 2009/0086934 A1 * | 4/2009 | Thomas | G10L 15/07 | 379/88.01 |
| 2009/0112599 A1 * | 4/2009 | Ljolje | G10L 15/142 | 704/270 |
| 2009/0276213 A1 * | 11/2009 | Hetherington | G10L 25/78 | 704/233 |
| 2010/0004932 A1 * | 1/2010 | Washio | G10L 15/05 | 704/255 |
| 2010/0191524 A1 * | 7/2010 | Washio | G10L 25/78 | 704/207 |
| 2010/0198597 A1 * | 8/2010 | Zhu | G10L 15/083 | 704/236 |
| 2011/0131043 A1 * | 6/2011 | Adachi | G10L 15/08 | 704/246 |
| 2011/0224980 A1 * | 9/2011 | Nakadai | G10L 15/20 | 704/233 |
| 2011/0282666 A1 * | 11/2011 | Washio | G10L 25/48 | 704/246 |
| 2011/0301950 A1 * | 12/2011 | Ouchi | G10L 15/28 | 704/231 |
| 2012/0072211 A1 * | 3/2012 | Edgington | G10L 15/04 | 704/231 |

(56) References Cited

U.S. PATENT DOCUMENTS

| | | | | |
|---|---|---|---|---|
| 2012/0173234 A1* | 7/2012 | Fujimoto | G10L 15/20 | 704/233 |
| 2012/0221330 A1* | 8/2012 | Thambiratnam | G10L 25/84 | 704/235 |
| 2012/0271633 A1* | 10/2012 | Yoshida | G10L 15/22 | 704/248 |
| 2013/0173267 A1* | 7/2013 | Washio | G10L 15/197 | 704/240 |
| 2013/0231929 A1* | 9/2013 | Komeji | G10L 15/20 | 704/233 |
| 2013/0253932 A1* | 9/2013 | Ariu | G10L 15/22 | 704/246 |
| 2013/0325475 A1* | 12/2013 | Chung | G10L 15/05 | 704/253 |
| 2013/0339025 A1* | 12/2013 | Suhami | H04R 25/00 | 704/271 |
| 2014/0032973 A1* | 1/2014 | Baker | G06F 11/3072 | 714/39 |
| 2014/0067388 A1* | 3/2014 | Manikandan | G10L 15/20 | 704/233 |
| 2014/0095166 A1* | 4/2014 | Bell | G10L 25/54 | 704/270 |
| 2014/0222430 A1* | 8/2014 | Rao | G10L 15/04 | 704/254 |
| 2014/0249812 A1* | 9/2014 | Bou-Ghazale | G10L 25/84 | 704/233 |
| 2014/0379332 A1* | 12/2014 | Rodriguez | G10L 17/00 | 704/219 |
| 2014/0379345 A1* | 12/2014 | Chung | G10L 15/05 | 704/248 |
| 2015/0039304 A1* | 2/2015 | Wein | G10L 25/78 | 704/233 |
| 2015/0095026 A1* | 4/2015 | Bisani | G10L 15/32 | 704/232 |
| 2015/0127338 A1* | 5/2015 | Reuter | G10L 15/20 | 704/233 |
| 2015/0199966 A1* | 7/2015 | Paulik | G10L 15/26 | 704/235 |
| 2015/0206544 A1* | 7/2015 | Carter | G10L 25/78 | 704/235 |
| 2015/0220507 A1* | 8/2015 | Mohajer | H04L 51/22 | 704/9 |
| 2015/0262577 A1* | 9/2015 | Nomura | G10L 15/22 | 704/231 |
| 2015/0301796 A1* | 10/2015 | Visser | G06F 3/167 | 715/728 |
| 2015/0348539 A1* | 12/2015 | Yamamuro | G10L 15/26 | 704/251 |
| 2015/0350451 A1* | 12/2015 | Aue | H04M 3/568 | 379/202.01 |
| 2016/0005394 A1* | 1/2016 | Hiroe | G10L 15/04 | 704/248 |
| 2016/0063989 A1* | 3/2016 | Deleeuw | G10L 15/22 | 345/473 |
| 2016/0125883 A1* | 5/2016 | Koya | G10L 15/22 | 704/232 |
| 2016/0217793 A1* | 7/2016 | Gorodetski | G10L 17/04 | |
| 2016/0358598 A1* | 12/2016 | Williams | G10L 15/04 | |

OTHER PUBLICATIONS

International Preliminary Report on Patentability and Written Opinion, dated Jan. 11, 2018, Applicant Amazon Technologies, Inc., 9 pgs.

Liu et al., "Accurate Endpointing with Expected Pause Duration", (Sep. 6, 2015), URL:http://www.isca-speech.org/archive/interspeech_2015/papers/i15_2912.pdf.

* cited by examiner

FIG. 9

902 — What is the weather [end]

904 — What is the weather in Seattle [end]

906 — What is the weather in Chicago [end]

908 — What is the weather in Detroit [end]

\* \* \*

912 — What is the weather in Seattle in winter [end]

914 — What is the weather in Seattle in summer [end]

\*\*\*

922 — What is the weather in Seattle in January [end]

\*\*\*

932 — What is the weather in Seattle on January twentieth [end]

\*\*\*

942 — What is the weather in Seattle tomorrow [end]

944 — What is the weather in Seattle tomorrow afternoon [end]

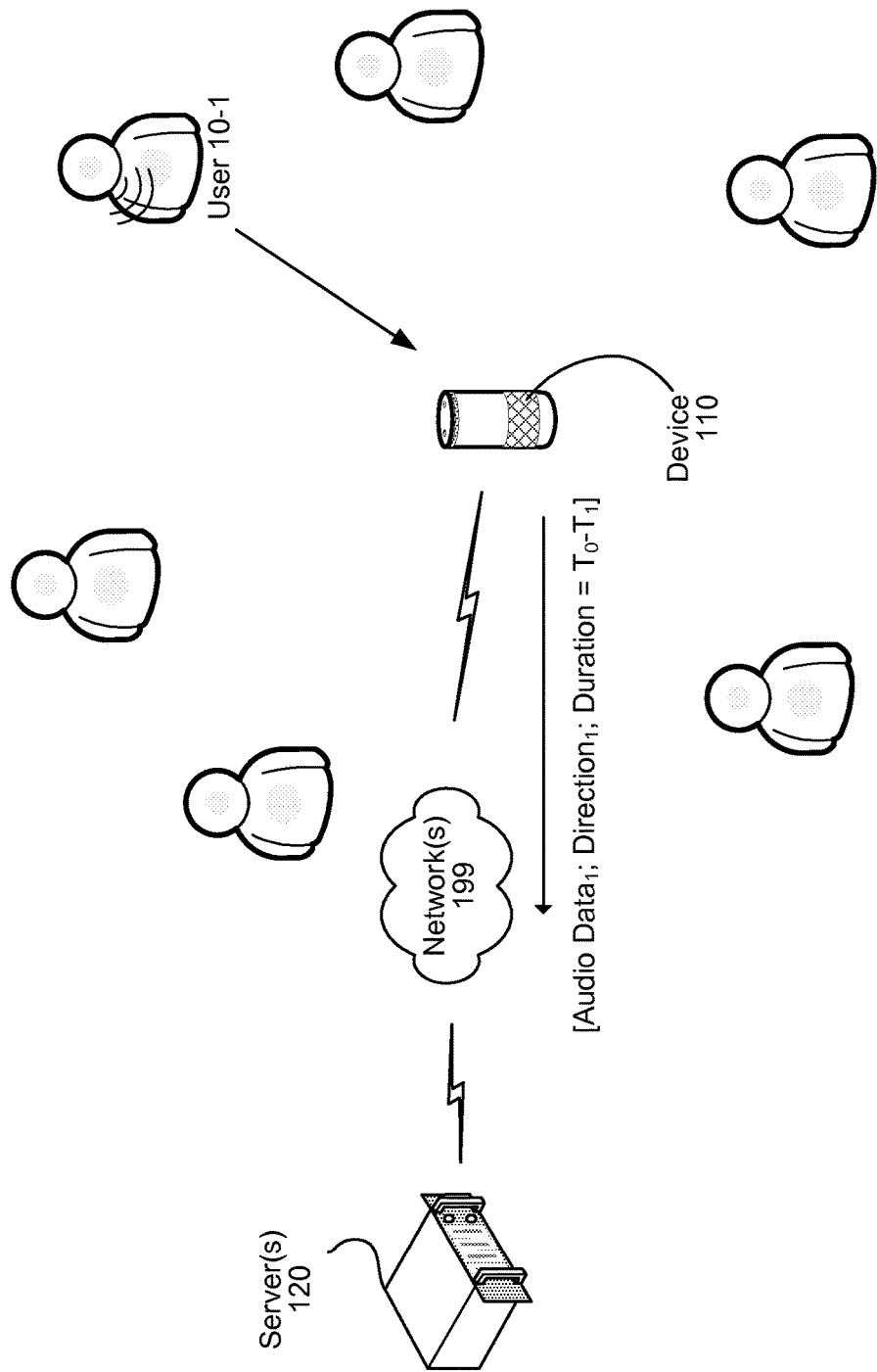

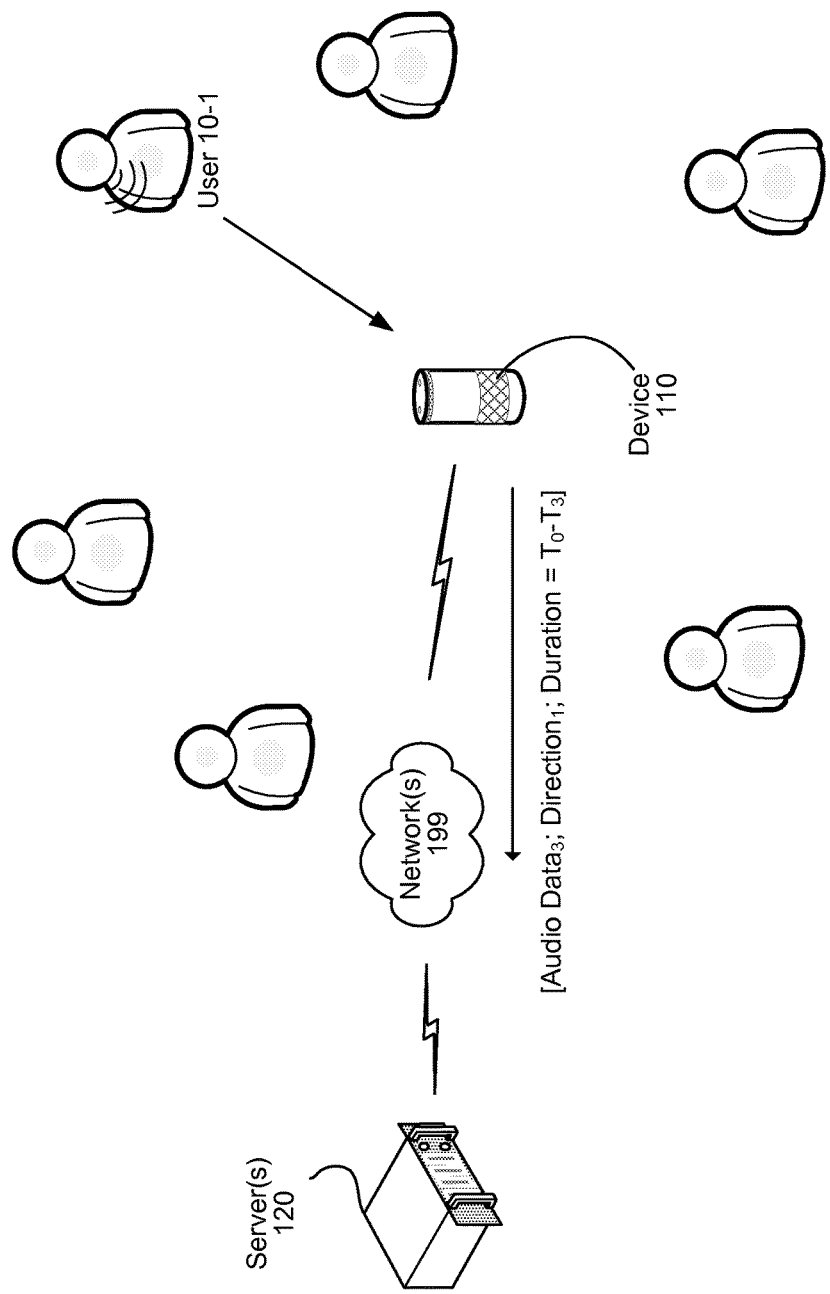

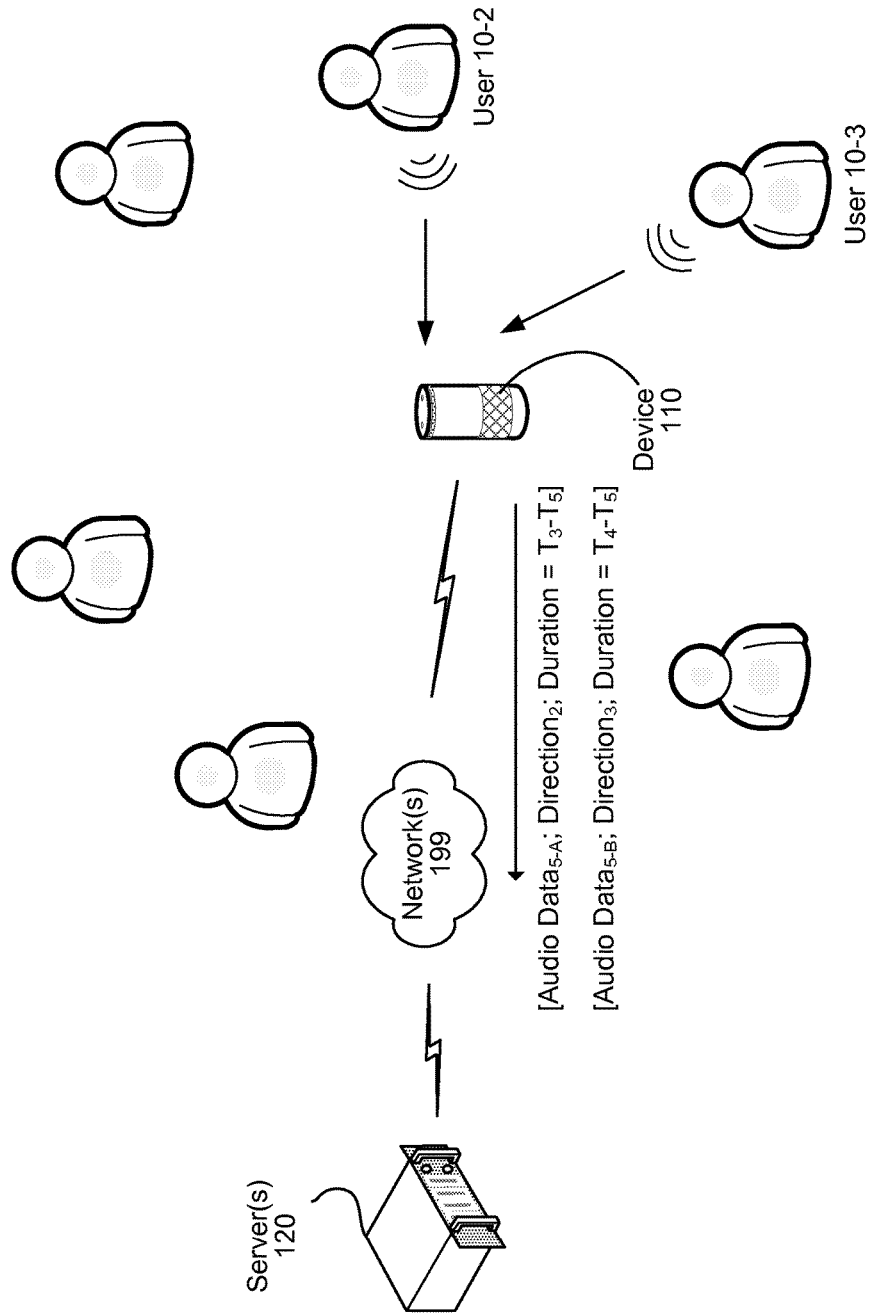

DIRECTION-BASED SPEECH ENDPOINTING

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 9 illustrates a number of hypotheses that may be considered by a speech recognition system.

FIGS. 10A-10E illustrate a system for incorporating direction and duration based information into speech endpointing.

DETAILED DESCRIPTION

Figure 1:
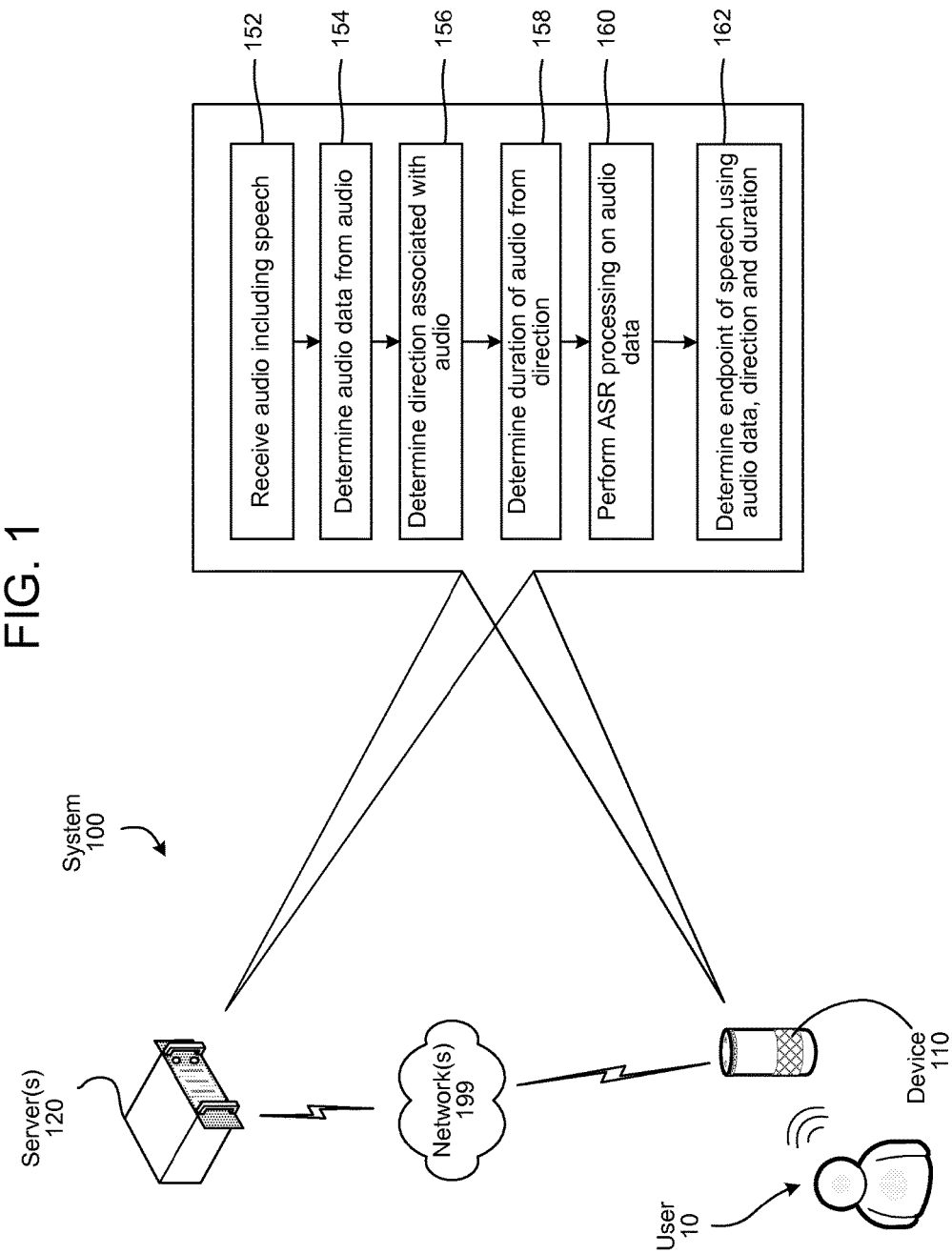
FIG. 1 illustrates a system for automatic speech recognition (ASR) according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. A typical such distributed environment may involve a local device having one or more microphones being configured to capture sounds from a user speaking and convert those sounds into an audio signal. The audio signal may then be sent to a downstream remote device for further processing, such as converting the audio signal into an ultimate command. The command may then be executed by a combination of remote and local devices depending on the command itself.

As part of a distributed speech processing system, a local device may be configured to continuously send all detected audio to the remote device. There are several drawbacks to such an approach. One drawback is that such communications would require significant bandwidth and networking resources. Another drawback to such an approach is that privacy concerns may make it undesirable for a local device to send all captured audio to a remote device. A still further drawback is that a remote device may waste significant computing resources processing all incoming audio when no commands are being issued in the majority of the audio.

To account for these problems, a local device may be configured to only activate upon a user speaking a particular waking command to wake the local device so the user may speak a further command. The waking command (which may be referred to as a wakeword), may include an indication for the system to perform further processing. The local device may continually listen for the wakeword and may disregard any audio detected that does not include the wakeword. Typically, systems are configured to detect a wakeword, and then process any subsequent audio following the wakeword (plus perhaps a fixed, but short amount of audio pre-wakeword) to detect any commands in the subsequent audio. As an example, a wakeword may include a name by which a user refers to a device. Thus, if the device was named "Alexa," and the wakeword was "Alexa," a user may command a voice controlled device to play music by saying "Alexa, play some music." The device, recognizing the wakeword "Alexa" would understand the subsequent audio (in this example, "play some music") to include a command of some sort and would perform speech processing on that audio to determine what the command is for execution. Provided services/commands may include performing actions or activities, rendering media, obtaining and/or providing information, providing information via generated or synthesized speech via a local device, initiating Internet-based services on behalf of the user, and so forth.

To determine when to stop processing audio data, a process called endpointing may be used. Traditional endpointing techniques typically rely on pauses detected in the audio data, however such techniques may be imprecise and may lead to errors, particularly when a user pauses speaking in mid-sentence, only to resume shortly thereafter. Current systems may determine an endpoint in the pause, thus resulting in cessation of speech processing at the incorrect time. Further, current systems that employ directional-based speech processing using techniques such as beamforming may suffer with endpointing in environments where multiple audio sources may cause the system to rapidly switch focus between different audio sources. Such environments may lead to latency, where the system spends time processing undesired audio, or inaccurate endpointing when the system endpoints incorrectly based on undesired audio.

Offered is a system to correct this problem where hypotheses are considered when determining a likely utterance endpoint. Further, the system may track the direction from which audio is received and a duration associated with that direction. Thus the system can determine when multiple audio sources are active in an environment by tracking changes in direction from one input audio to the next. The system may weight certain audio data and/or active hypotheses based on the direction and/or duration indications that are associated with audio data. Further, the system may filter audio data using the direction and/or duration information to prevent the system from considering undesired audio, which may lead to latency.

FIG. 1 illustrates a system such as the one described above. As illustrated, a system 100 may include a speech controlled device 110 at the location of a user 10. The device 110 may be connected over a network 199 to one or more server(s) 120. The system 100 may be a distributed speech processing system where the device 110 captures audio spoken by the user 10 and the server(s) perform speech processing on the audio as described below in reference to FIG. 2. The device may include a plurality of microphones and thus be capable of determining an incoming direction of audio. As shown in FIG. 1, the system may receive (152) audio including speech. The system may then determine (154) audio data from the audio. The system may also determine (156) a direction associated with the audio and determine (158) a duration during which audio has been received from the direction. The system may perform (160) ASR processing on the audio data and may determine (162) an endpoint of the speech using the audio data, direction, and duration.

Figure 2:
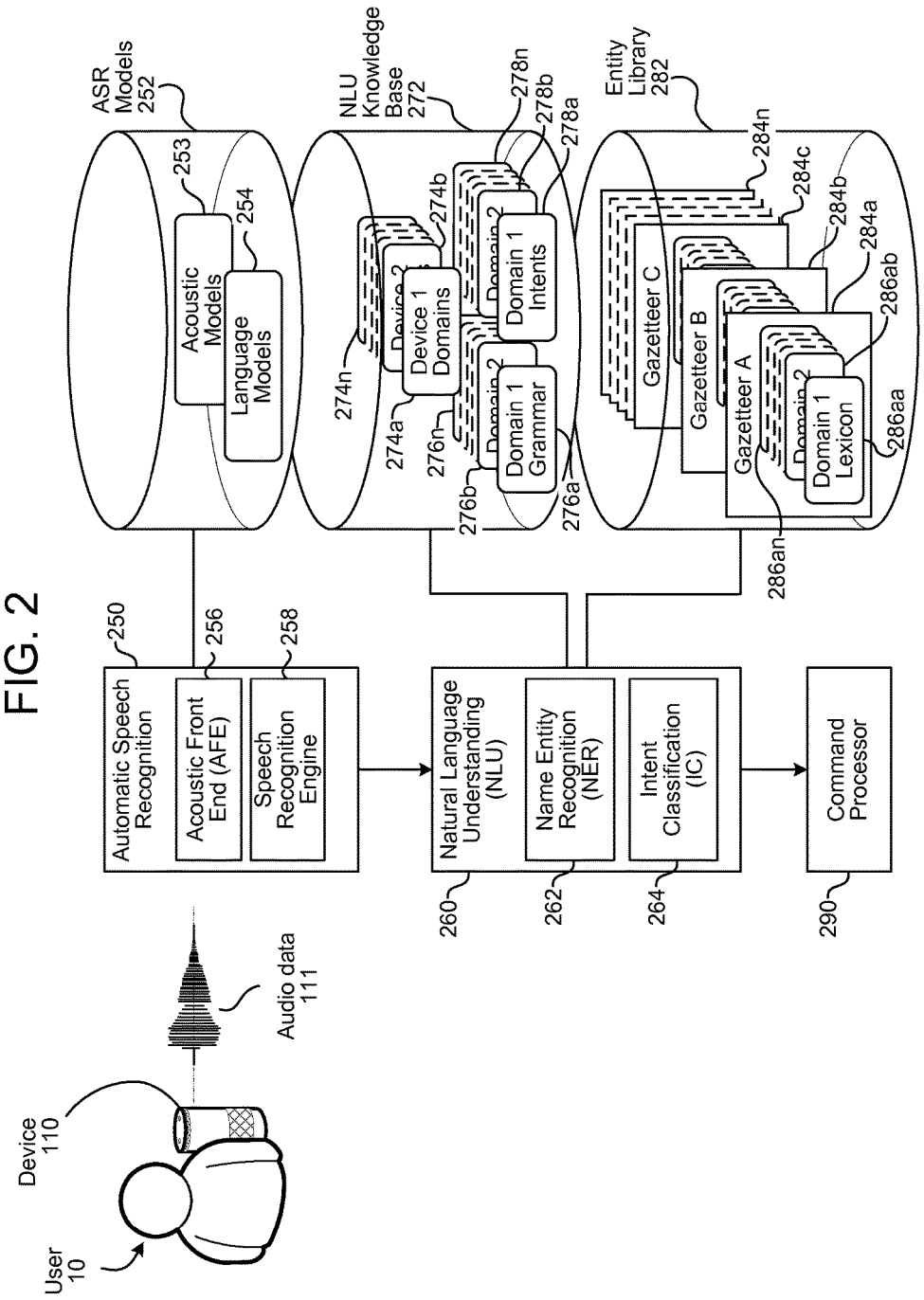
FIG. 2 is a conceptual diagram of how a spoken utterance may be processed according to embodiments of the present disclosure.

The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. The system may include a device 110, which may be a general purpose device (such as a mobile phone, tablet, etc.) or a specific purposes device such as an audio device configured to play music. Although the teachings below apply to many different types of devices 110, for present purposes operation of the system may be illustrated using the example of an audio device 110. The audio device 110 may include a plurality of applications that are configured to work in conjunction with other elements of the audio device 110 to provide services and functionality. The applications may include media playback services such as music players. Other services or operations performed or provided by the applications may include, as examples, requesting and consuming entertainment (e.g., gaming, finding and playing music, movies or other content, etc.), personal management (e.g., calendaring, note taking, etc.), online shopping, financial transactions, database inquiries, and so forth. In some embodiments, the applications may be pre-installed on the audio device 110, and may implement core functionality of the audio device 110. In other embodiments, one or more of the applications may be installed by the user 10, or otherwise installed after the audio device 110 has been initialized by the user 10, and may implement additional or customized functionality as desired by the user 10.

An audio capture component, such as a microphone of the audio device 110, captures audio corresponding to a spoken utterance. Details for capturing the spoken utterance, such as determining the beginning and/or end of the utterance and configuring an audio signal corresponding to the utterance, is discussed below. An audio signal/audio data 111 comprising a representation of the utterance may be sent to an ASR component 250. The ASR component 250 may be local to the audio device 110 and/or located on a remote server 120. The ASR component 250 converts the audio into text. The ASR component 250 thus transcribes audio data into text data representing the words of the speech contained in the audio data. The text data may then be used by other downstream components for various purposes, such as executing system commands, inputting data, etc. The downstream component may be any number of components or applications that operate on ASR output. Although many such downstream applications are envisioned for these techniques, for purposes of illustration this description will use an NLU process and application as the NLU process illustrates the benefits of early ASR output as described below. For example, the NLU process may take ASR output and determine, for example, the actions (sometimes referred to as a command, "application response" or "app response") based on the recognized speech of the early ASR output.

A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model or dialog-based interactive voice response (IVR) system)). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine/decoder 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. The AFE 256 may be located on a device 110 or on a server 120. If on a device 110, the device may send the output of the AFE, such as the feature vectors, over a network 199 to the server 120 for further processing.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the appliance 110 may process audio data into feature vectors and transmit that information to a server across a network 199 for ASR processing. Feature vectors may arrive at the server encoded, in which case they may be decoded prior to processing by the processor executing the speech recognition engine 258. A sliding window technique may be used to determine feature vectors for processing. For example, each frame of audio may be 25 milliseconds (ms) long, but a next audio frame starts 10 ms from the end of the previous frame. Thus audio data from a certain point in time may appear in multiple frames. A fast-Fourier transform (FFT) may be applied to obtain a short-term magnitude spectrum corresponding to the frame. Then feature values for the frame data may be determined, for example by applying filter banks to obtain feature values, which may then be included in a feature vector corresponding to the audio frame. One or more feature vectors may correspond to a single frame. Other techniques for obtaining feature vectors may also be used.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on audio device 110 or in a music playing appliance, configured to execute a music playing command. The server may configure data corresponding to the command included in the utterance (which may be referred to as utterance command data). Depending on system configuration the utterance command data may be created by and output from the NLU 260, in which case the command may be executed by the command processor 290 (located either on the server 120, device 110, or located elsewhere), or the utterance command data may be created by and output from the command processor 290, in which case the utterance command data may be sent to a downstream component.

Turning now to the identification of speech within the audio data 111, for example the system 100 may use various techniques for determining the beginning and end of speech to be processed. For purposes of illustration, in system 100 the beginpoint of speech is described as determined by the device 110 and the endpoint of the speech is described as determined by the server 120 (after receipt of corresponding audio data from the device 110), but different components may perform the beginpointing/endpointing without diverging from the present disclosure.

Once speech is detected in the audio received by the device 110, the device may perform wakeword detection to determine when a user intends to speak a command to the device 110. As noted above, a wakeword is a special word that the device 110 is configured to recognize among the various audio inputs detected by the device 110. The wakeword is thus typically associated with a command to be executed by the device 110 and/or overall system 100. Following detection of the wakeword the device 110 may send audio data corresponding to the utterance (which may include the wakeword itself) to the server(s) 120. The server(s) 120 may then perform speech processing on the audio data 111 until an endpoint is detected (discussed below) and may also and execute any resulting command included in the utterance.

Figure 3:
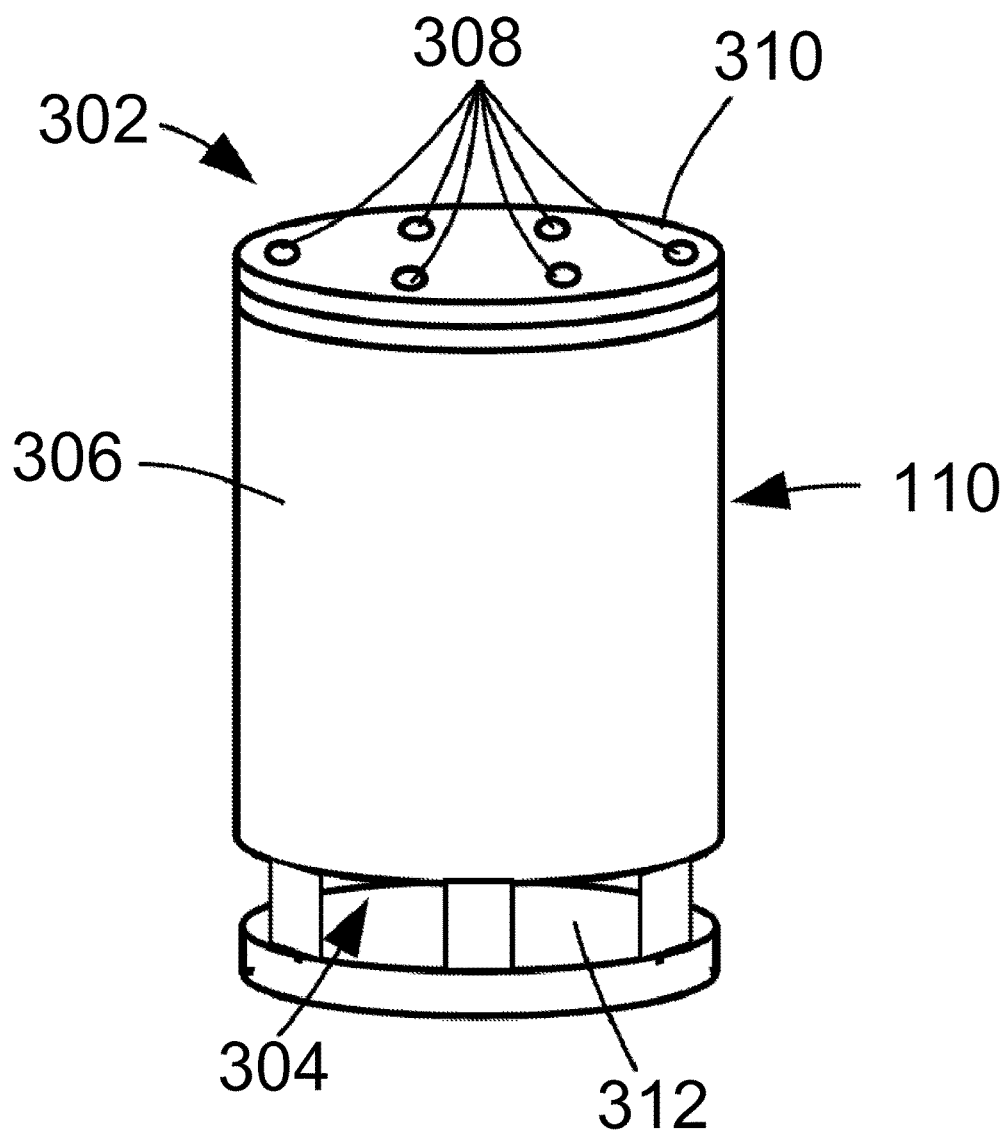
FIG. 3 is an illustration of an audio device that may be used according to embodiments of the present disclosure.

The audio device 110 may be configured with a number of components designed to improve the capture and processing of spoken commands. FIG. 3 illustrates details of microphone and speaker positioning in an example embodiment of an audio device 110. In this embodiment, the audio device 110 is housed by a cylindrical body 306. The microphone array 302 comprises six microphones 308 that are laterally spaced from each other so that they can be used by audio beamforming components to produce directional audio signals. The microphones 308 may, in some instances, be dispersed around a perimeter of the device 110 in order to apply beampatterns to audio signals based on sound captured by the microphones 308. In the illustrated embodiment, the microphones 308 are positioned in a circle or hexagon on a top surface 310 of the cylindrical body 310. Each of the microphones 308 is omnidirectional in the described embodiment, and beamforming technology is used to produce directional audio signals based on signals form the microphones 308. In other embodiments, the microphones may have directional audio reception, which may remove the need for subsequent beamforming.

In various embodiments, the microphone array 302 may include greater or less than the number of microphones shown. For example, an additional microphone may be located in the center of the top surface 310 and used in conjunction with peripheral microphones for producing directionally focused audio signals.

The speaker 304 may be located at the bottom of the cylindrical body 306, and may be configured to emit sound omnidirectionally, in a 360 degree pattern around the audio device 110. For example, the speaker 304 may comprise a round speaker element directed downwardly in the lower part of the body 306, to radiate sound radially through an omnidirectional opening or gap 312 in the lower part of the body 306. The gap may be covered by a mesh or other permeable covering to enhance the visual appeal of the device 110 without impacting the ability of the device to output audio.

Using the microphone array 302 and the plurality of microphones 308 the audio device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The audio device may include an audio processing module 1240 (illustrated in FIG. 12) that may include one or more audio beamformers or beamforming components that are configured to generate an audio signal that is focused in a direction from which user speech has been detected. More specifically, the beamforming components may be responsive to spatially separated microphone elements of the microphone array 302 to produce directional audio signals that emphasize sounds originating from different directions relative to the audio device 110, and to select and output one of the audio signals that is most likely to contain user speech.

Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speech recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

Figure 4:
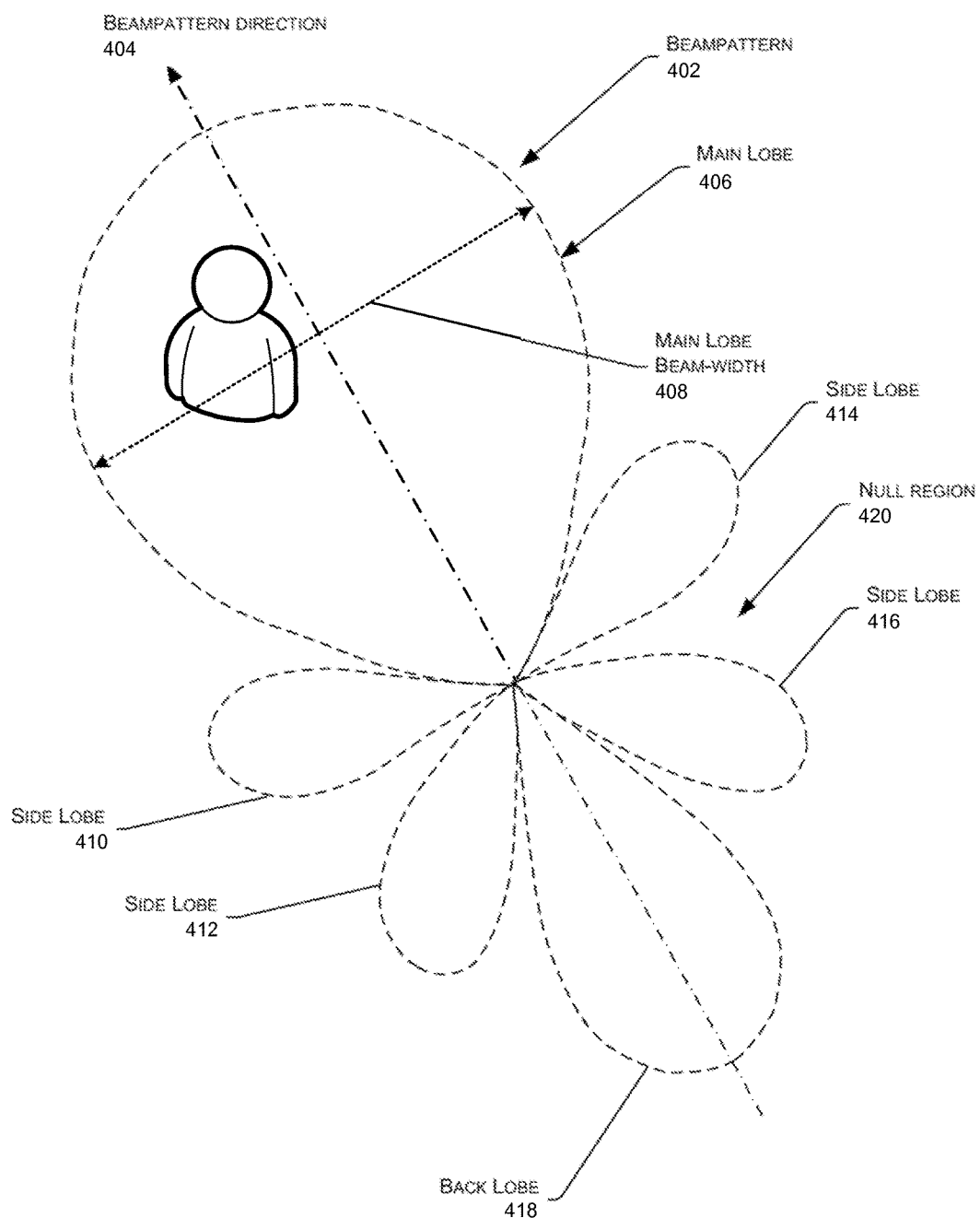
FIG. 4 is an illustration of beamforming according to embodiments of the present disclosure.

FIG. 4 illustrates a schematic of a beampattern 402 formed by applying beamforming coefficients to signal data acquired from a microphone array of the voice-controlled device 110 of FIG. 1. As mentioned above, the beampattern 402 results from the application of a set of beamformer coefficients to the signal data. The beampattern generates directions of effective gain or attenuation. In this illustration, the dashed line indicates isometric lines of gain provided by the beamforming coefficients. For example, the gain at the dashed line here may be +12 decibels (dB) relative to an isotropic microphone.

The beampattern 402 may exhibit a plurality of lobes, or regions of gain, with gain predominating in a particular direction designated the beampattern direction 404. A main lobe 406 is shown here extending along the beampattern direction 404. A main lobe beam-width 408 is shown, indicating a maximum width of the main lobe 406. In this example, the beampattern 402 also includes side lobes 410, 412, 414, and 416. Opposite the main lobe 406 along the beampattern direction 404 is the back lobe 418. Disposed around the beampattern 402 are null regions 420. These null regions are areas of attenuation to signals. In the example, the user 10 resides within the main lobe 406 and benefits from the gain provided by the beampattern 402 and exhibits an improved SNR ratio compared to a signal acquired with non-beamforming. In contrast, if the user 10 were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest. Beamforming may result in directional audio signal(s) that may then be processed by other components of the device 110 and/or system 100.

While beamforming alone may increase a signal-to-noise (SNR) ratio of an audio signal, combining known acoustic characteristics of an environment (e.g., a room impulse response (RIR)) and heuristic knowledge of previous beampattern lobe selection may provide an even better indication of a speaking user's likely location within the environment. In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

To determine a value of an acoustic characteristic of an environment (e.g., an RIR of the environment), the device 110 may emit sounds at known frequencies (e.g., chirps, text-to-speech audio, music or spoken word content playback, etc.) to measure a reverberant signature of the environment to generate an RIR of the environment. Measured over time in an ongoing fashion, the device may be able to generate a consistent picture of the RIR and the reverberant qualities of the environment, thus better enabling the device to determine or approximate where it is located in relation to walls or corners of the environment (assuming the device is stationary). Further, if the device is moved, the device may be able to determine this change by noticing a change in the RIR pattern. In conjunction with this information, by tracking which lobe of a beampattern the device most often selects as having the strongest spoken signal path over time, the device may begin to notice patterns in which lobes are selected. If a certain set of lobes (or microphones) is selected, the device can heuristically determine the user's typical speaking position in the environment. The device may devote more CPU resources to digital signal processing (DSP) techniques for that lobe or set of lobes. For example, the device may run acoustic echo cancellation (AEC) at full strength across the three most commonly targeted lobes, instead of picking a single lobe to run AEC at full strength. The techniques may thus improve subsequent automatic speech recognition (ASR) results as long as the device is not rotated or moved. And, if the device is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

By focusing processing resources on a portion of an audio signal most likely to include user speech, the SNR of that portion may be increased as compared to the SNR if processing resources were spread out equally to the entire audio signal. This higher SNR for the most pertinent portion of the audio signal may increase the efficacy of the speech-recognition engine 258 when performing speech recognition on the resulting audio signal.

To determine the beginning or end of an audio command, a number of techniques may be used. In one embodiment the system may determine pauses in spoken words and may interpret those pauses as potential breaks in a conversation. Those breaks in a conversation may be considered as breaks between utterances and thus considered the beginning (beginpoint) or end (endpoint), of an utterance. The beginning/end of an utterance may also be detected using speech/voice characteristics. Other techniques may also be used to determine the beginning of an utterance (also called beginpointing) or end of an utterance (endpointing). Beginpointing/endpointing may be based, for example, on the number of silence/non-speech audio frames, for instance the number of consecutive silence/non-speech frames. For example, some systems may employ energy based or acoustic model based voice activity detection (VAD) techniques. Such techniques may determine whether speech is present in an audio input based on various quantitative aspects of the audio input, such as the spectral slope between one or more frames of the audio input; the energy levels (such as a volume, intensity, amplitude, etc.) of the audio input in one or more spectral bands; zero-crossing rate; the signal-to-noise ratios of the audio input in one or more spectral bands; or other quantitative aspects. These factors may be compared to one or more thresholds to determine if an break in speech has occurred that qualifies as a beginpoint/endpoint. Such thresholds may be set according to user input, or may be set by a device. In some embodiments, the beginpointing/endpointing may be further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored. The beginpointing/endpointing may compare the energy level to the energy level threshold (and optionally to the threshold duration) to determine whether the energy level threshold is met.

In certain embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence/non-speech. Still other techniques may be used to determine whether speech begins/ends in the input audio data.

Various machine learning techniques may be used to determine a beginning of an utterance or an end of an utterance as discussed above. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used during training.

Training examples of sample utterance audio along with labeled ground truths about utterance beginnings, utterance conclusions, existence/lengths of pauses, etc. may be used to training machine learning models for use at runtime to make such determinations. Further, tags representing the length of pauses and semantic content of potential utterances may be identified and inserted in the training data for use when training a model. During run time processing, the model and sematic tags representing the length of pauses in speech may be used to determine, for example, the likelihood that the system should await more speech before determining the end of an utterance. Depending on the determination, the number of frames of non-speech that may be processed before the beginning of the utterance is established is adjusted. The number of non-speech frames prior to detected speech may determine when the device/system determines the beginning or end of an utterance.

The length of a pause sufficient to qualify the pause as a beginpoint/endpoint may depend on the identity of the speaker. If the system is configured to perform speaker identification (techniques for which are known in the art), the system may identify the speaker and adjust the pause length sufficient to determine an endpoint accordingly. The system may also be configured to learn pause tendencies of different speakers and to adjust its endpointing processing accordingly. For example, during system training/enrollment, a speaker's pause tendencies between utterances or between topics may be recorded and used to train the endpointing processing of the system. Such tendencies may also be recorded at runtime and used to further adjust the system. Different pause lengths may also be configured for different spoken languages as the pause length may vary depending on the language spoken (for example pauses in conversational English may be different from pauses in conversational Spanish). The begin/end of an utterance may also be determined by various characteristics of the speech including pitch, prosody, volume, rhythm, stress, intonation, cepstrum, etc. of the speech which may be determined by audio and/or speech processing components of the device. For example, a rising or falling tone of a voice may indicate a new utterance, the end of a command, etc. The system may train on voice characteristics (which may or may not be also tied to speaker identity) that indicate when an utterance ends, and thus when an end of the speech should be marked by the system. These techniques may be used to modify/customize the language models discussed above, such that expected pauses in the language model(s) may be based on an identity of a speaker.

Using various of the techniques described above, the beginpointing/endpointing may determine a confidence level whose value corresponds to a likelihood that the location of the point in questions represents the start/end of an utterance/command. The confidence score may depend on factors such as the technique used to determine the marker, the length of the pause, the speaker identity, etc. For example, if the confidence level satisfies a confidence level threshold, it may be determined that a detected silence is sufficient (e.g., the length of a pause in the speech exceeds a threshold), that speech is present in the audio input, and that an utterance begin/end may be marked. However, if the confidence level does not satisfy the confidence level the system may determine that there is no speech in the audio input.

Once a wakeword/beginpoint is detected, the device 110 may begin sending audio data to the server 120. The server 120 will continue speech processing on the audio data until an endpoint is detected. The audio data from the beginpoint to the endpoint is thus considered by the system 100 when performing the speech processing for the utterance.

Traditionally, the process for endpointing has been similar to the process for beginpointing as discussed above. One difference between endpointing and beginpointing, however, is that during endpointing, the system has some knowledge of the contents of the utterance that is being endpointed. Thus, while beginpointing may sometimes occur when there is no prior speech, endpointing occurs when there is prior speech, namely the speech of the utterance whose endpoint is being detected.

Further, one drawback to current VAD or other techniques that rely simply on pause length, is that they have difficulty distinguishing between mid-utterance pauses, and pauses that truly indicate the end of an utterance. Further, current systems may encounter difficulty in noisy environments where separating speech from noise impacts proper pause detection. Current Offered is a speech processing system that makes use of the content of speech when determining an endpoint of the utterance. The present system considers the content of the speech using information from acoustic models and language models when determining an endpoint. Further, the offered systems may use beamforming techniques to apply a direction-based processing when considering information from the language models to make a more informed decision regarding endpointing and thus be more robust to noisy environments and other less-than-ideal conditions.

This system improves on current VAD or other techniques that rely simply on pause length and thus improves the system's ability to distinguish between mid-utterance pauses and end of utterance pauses. An endpoint detector may determine an endpoint based on different hypotheses determined by the speech recognition engine 258. Based on an individual hypothesis, the system determines an expected pause length over multiple active speech hypotheses and whether the actual pause length matches the averaged expected pause length for purposes of declaring an endpoint. By considering active hypotheses, which include a sentence end, the system can more robustly distinguish between expected within and end-of sentence pause duration. The system may determine the pause length/duration on an ongoing basis, for example tracking the amount of non-speech immediately preceding a particular node in a lattice for a particular hypothesis. Alternatively, the system may check, at a particular time during the processing, the amount of non-speech immediately preceding the end of each active hypothesis. The pause length may be determined, for example, by a number of non-speech frames immediately preceding the end of each hypothesis. The system may then determine weighted pause lengths by multiplying the weighted pause lengths of each active hypothesis by the respective hypothesis' ASR probability as determined by the speech recognition engine. The system may then add the weighted pause lengths of the active hypotheses together to arrive at an expected pause duration. The system may also add the weighted pause lengths of the active hypotheses in an end state to arrive at an expected pause duration at end state. The system may then compare the cumulative weighted pause lengths to one or more thresholds. For example the system may compare the expected pause duration to a first threshold and the expected pause duration at end state to a second threshold. The system may then determine an endpoint when the expected pause durations exceed their respective thresholds. The expected pause duration, thresholds, or other factors may be adjusted depending on a direction that the audio data was received from and/or a duration during which the system was receiving audio data from that direction. The determination of the endpoint is thus an estimation that a spoken command has concluded, where the confidence of the estimation is based on the expected pause duration, the direction audio data was received from, and a duration during which audio was received from that direction. When a likely endpoint is determined, the system may perform other operations on the received audio, for example NLP and/or other command processing.

To understanding the incorporate of acoustic model and language model data during endpointing, some further data is provided below regarding detailed operation of the speech recognition engine 258.

As noted above, during speech recognition, an ASR module 250/speech recognition engine 258 may utilize acoustic models 253 to determine possible phonemes or other phonetic units that match the incoming audio data feature vectors. The probable phonemes and related states/state transitions may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 5:
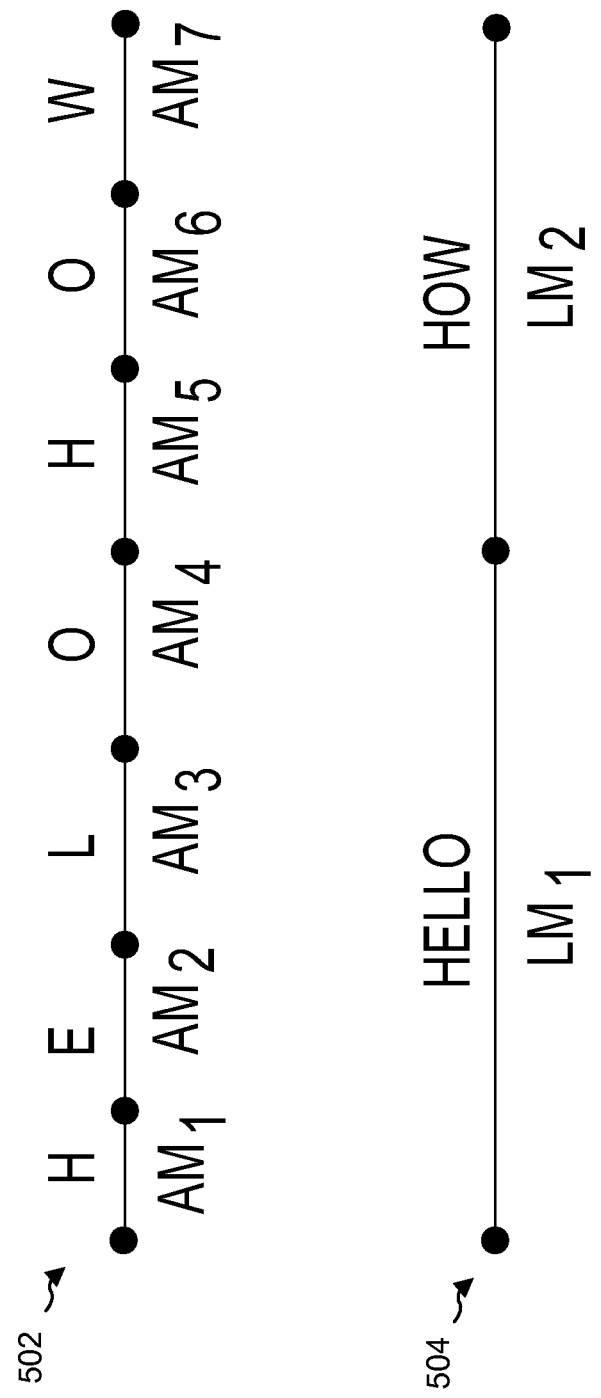
FIG. 5 illustrates phoneme processing and word processing according to one aspect of the present disclosure.

FIG. 5 illustrates the relationship between acoustic modeling and language modeling. As illustrated, each processed phoneme included in the path 502 is associated with an acoustic model score $AM_1$ through $AM_7$. The language model is then applied to associate each word in the path 504 with a language model score $LM_1$ or $LM_2$.

As part of the language modeling (or in other phases of the ASR processing) the speech recognition engine 258 may, to save computational resources, prune and discard low recognition score states or paths that have little likelihood of corresponding to the spoken utterance, either due to low recognition score pursuant to the language model, or for other reasons. Such pruned paths are considered inactive. Further, during the ASR processing the speech recognition engine 258 may iteratively perform additional processing passes on previously processed utterance portions. Later passes may incorporate results of earlier passes to refine and improve results. Paths which are being currently processed and considered as a potential output of the system are considered active hypotheses.

Figure 6:
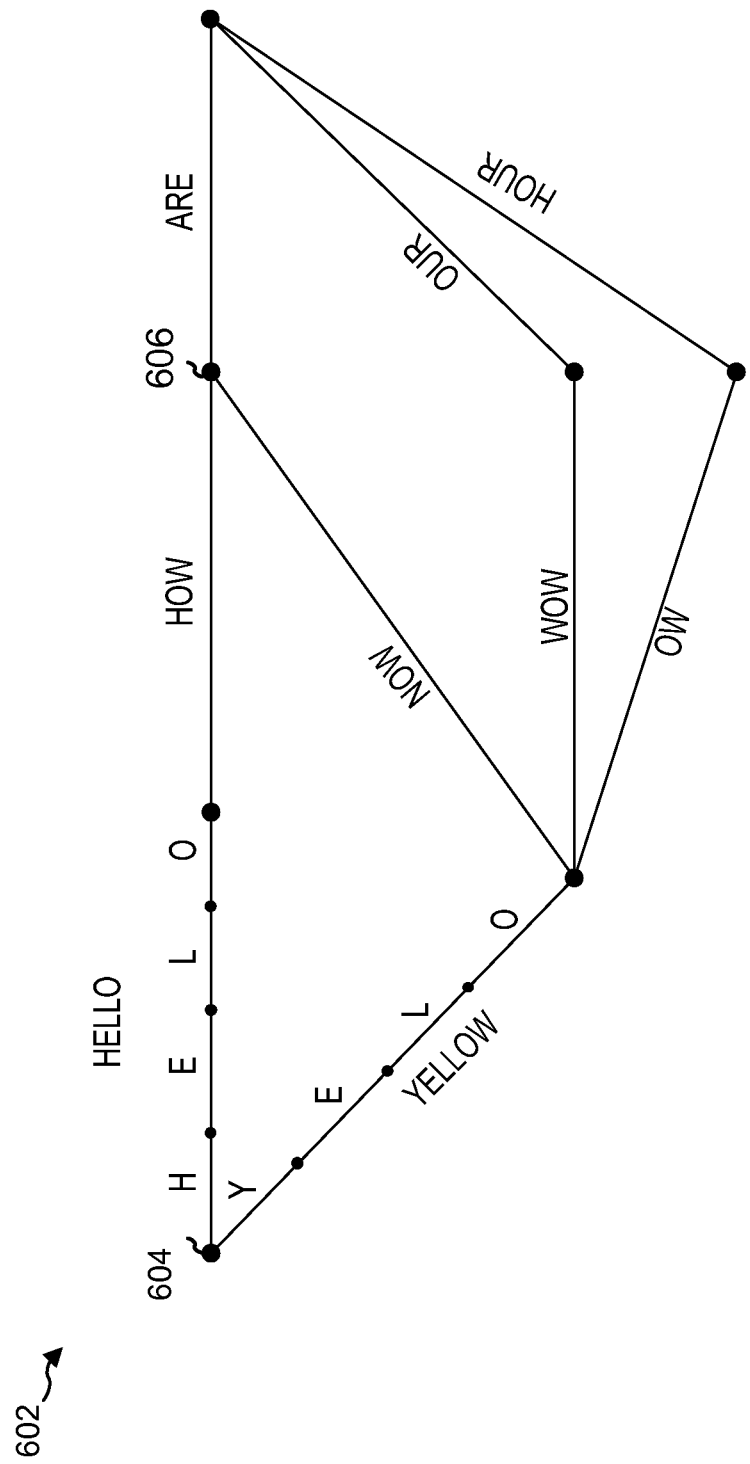
FIG. 6 illustrates a speech recognition lattice according to one aspect of the present disclosure.
Figure 7:
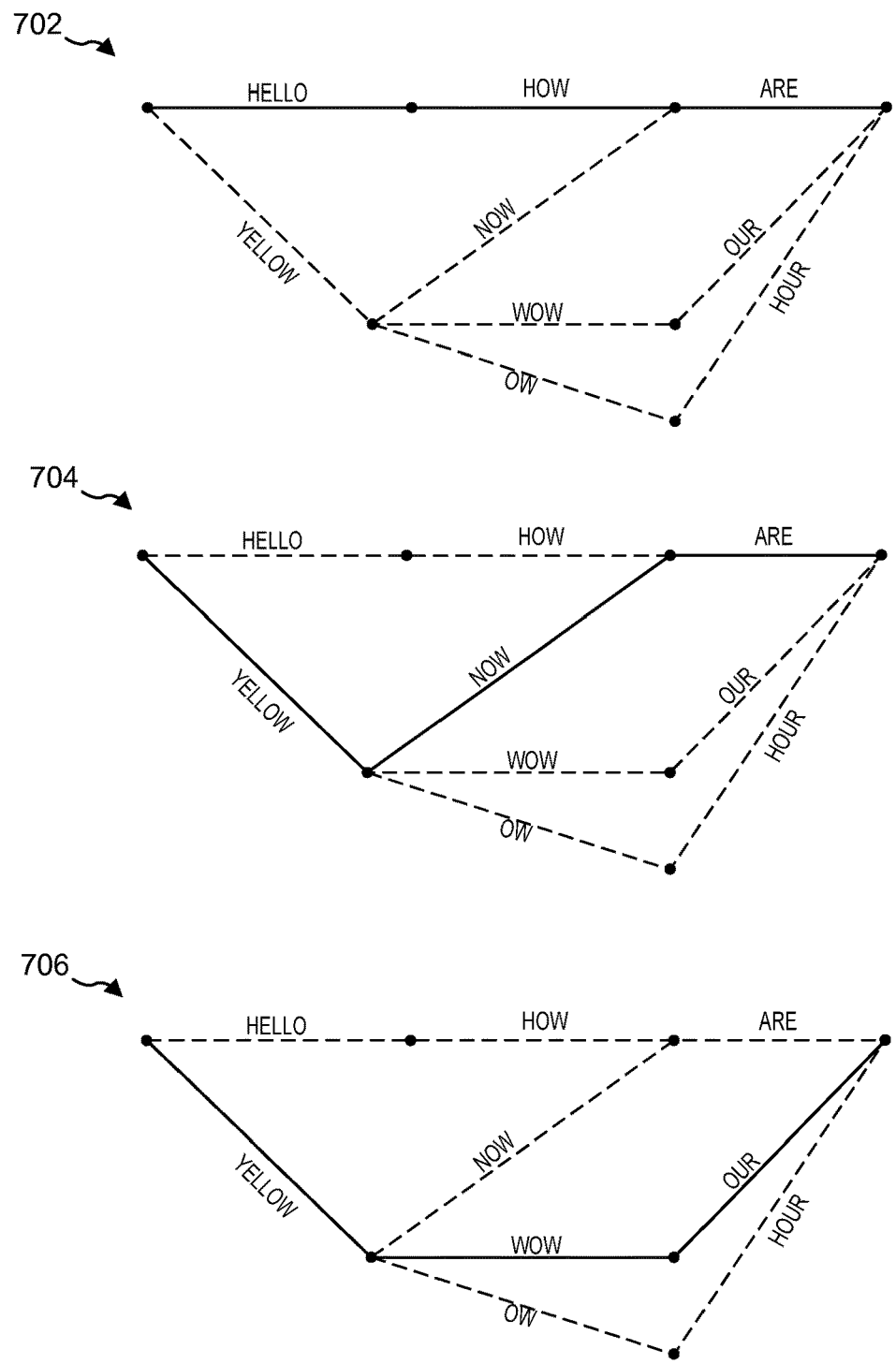
FIG. 7 illustrates speech recognition lattices according to one aspect of the present disclosure.

The speech recognition engine 258 may combine potential paths into a lattice representing speech recognition results. A sample lattice is shown in FIG. 6. The lattice 602 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 604 and node 606 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 258 as the ASR result for the associated feature vectors.

Figure 8:
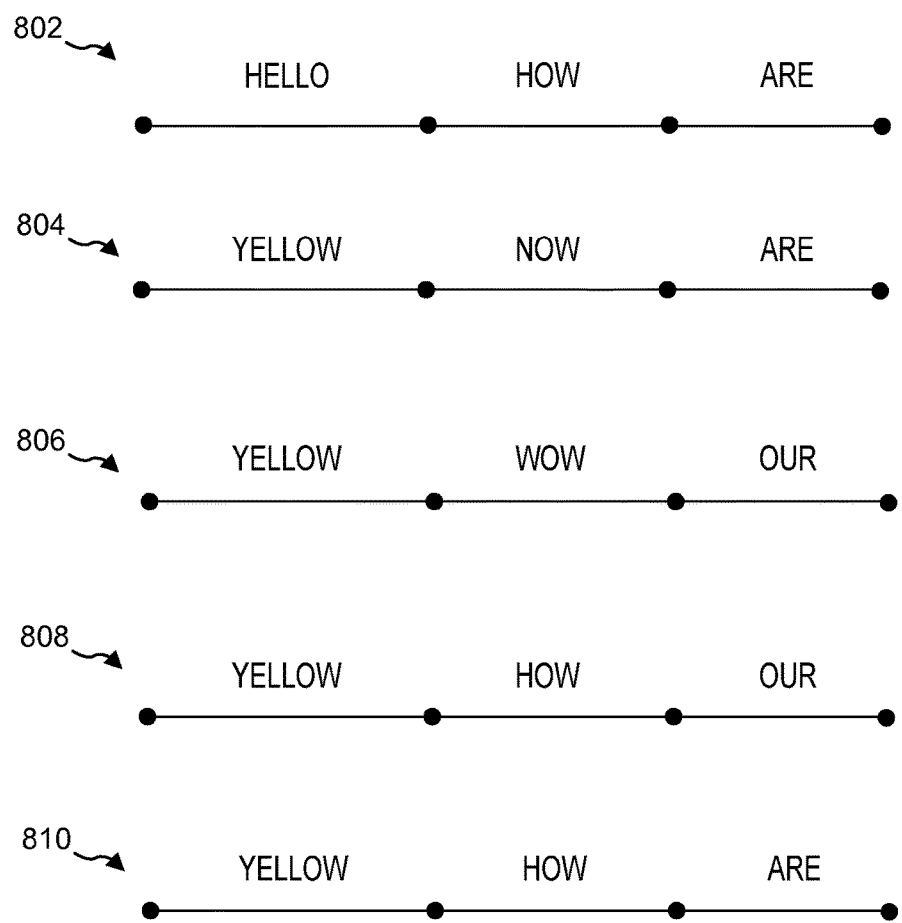
FIG. 8 illustrates a number of hypotheses associated with the lattice of FIG. 6.

Illustrated in FIG. XXE are different potential paths along the lattice 602. As shown in FIG. XXE, path XXE02 results in "hello how are," path XXE04 results in "yellow now are" and path XXE06 results in "yellow wow our." As can be seen, many such paths are possible even in the small example lattice 602. An example of such paths 802-810 are shown in FIG. 8. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc.

Each hypotheses may include an end state which indicates the end of the utterance of the specific hypotheses. The end state is a state, for example an HMM state, used by the acoustic model and/or language model to indicate a particular hypothesis is complete. As the system traverses the lattice and considers potential hypotheses, the system considers whether the utterance has potentially reached an end state based on the confidence score of the particular hypothesis. The likelihood that the utterance has reached an end state thus may depend, on the overall confidence of the particular hypothesis that may have reached an end state. The likelihood that the utterance has reached an end state thus may also depend, for example, on the individual words of the hypothesis and whether the speech continues. For example, "what is the weather" may be a complete utterance by itself, but it also may be followed by additional words, such as "in Seattle," "in January," "tomorrow," etc. This is illustrated in FIG. 9. All the utterances illustrated in FIG. 9 are example hypotheses that the system may be under active consideration after already recognizing the words "what is the weather." Many other examples are also possible. If no further words are recognized, the system may determine that an end state has been reached and may select 902 as the highest scoring utterance. However, additional words may cause the system to discard 902, and to instead consider the remaining hypotheses. Thus, as the system processes more words, individual hypotheses may become more or less likely (or drop out entirely to become an inactive hypothesis). And inversely, the longer a pause continues, the more likely the system will select a complete hypothesis at that moment and discard hypotheses that have not yet reached an end state. During traditional processing, it can be difficult to differentiate between the within-sentence pause and end-of sentence pause. For example, when speaking "what is the weather," a user may add additional information after some pause, like "what is the weather [Pause] in Seattle", or "What is the weather [Pause] in Seattle [Pause] tomorrow." In an HMM-based ASR system, the end-of sentence probability is modeled by the end states of the language model. For example, to determine an endpoint for a particular hypothesis, if an acoustic model hypothesis has recognized a certain number of non-speech frames, a corresponding hypothesis may indicate an end state, assuming that the prior words of the hypothesis indicate a complete utterance.

An endpoint detector that uses the speech recognition engine 258 can take advantage of hypothesis information. As described in detail below, as the system progresses through a lattice, the likelihood that an endpoint has been reached may be determined by considering the overall pause duration and the active hypotheses that are under consideration by the ASR engine. As different hypotheses may correspond to different experienced pause durations (for example, as a result of specific hypotheses differing as to whether certain frames include speech or do not include speech) it may be desirable to consider pause duration across a plurality of active hypotheses.

The ASR module 250 may track a number of received audio frames that do not include speech, or do not include sufficient audio features to be considered speech. Such frames may be considered non-speech, or pause frames. A non-speech or pause frame may be determined by comparing the data from one or more feature vector(s) associated with the frame with one or more thresholds, to determine if the feature vector(s) represent audio likely to correspond to speech to be processed or likely to correspond to other audio such as noise, silence, background talking (i.e. speech not to be processed), etc. Thus a non-speech/pause frame is one in which the audio data of the respective frame is determined not to correspond to an utterance for ASR processing. Machine learning techniques may be used (such as those described herein) to train a model to determine when incoming audio data matches a non-speech/pause frame. Tracking of non-speech frames may be incorporated into processing by an acoustic model and/or language model, for example by adding node(s)/path(s) at the end of an active hypothesis where such node(s)/path(s) represent a certain duration of non-speech, for example one or more non-speech/pause frames. Such node(s)/path(s) may be considered non-speech node(s)/path(s), or pause node(s)/path(s). Such pause node(s)/path(s) may indicate a certain duration of audio that included a pause or non-speech. Such node(s)/path(s) may be differentiated from other node(s)/paths(s) which may also include other non-speech, such as semantic tags, state indicators, or other non-speech items.

Alternatively, or additionally, the ASR module 250 may run one or more counters, for example, one for each hypothesis, that counts a number of immediately preceding non-speech frames predicted by that hypothesis. The system may refer to such counters during processing to determine how much non-speech is associated with a particular hypothesis. The system may also refer to such counters when encountering a pause node(s)/path(s), particularly if the pause node(s)/path(s) does not track the duration of an ongoing pause. The counter will indicate to the system how long a pause has been ongoing. Upon predicting a frame that does include speech for processing, the counter for that particular hypothesis may be reset. Further, a phoneme path/node may be added to the hypothesis, such that the end of the hypothesis may no longer be a path and/or node associated with non-speech. As an example, if a first hypothesis predicts a non-speech frame, a counter associated with the first hypothesis may be set to one and/or a path/node may be added to the end of the first hypothesis indicating non-speech. If the first hypothesis predicts five more non-speech frames, the counter may be incremented each time until it ultimately reaches a value of six. Further, non-speech paths/non-speech nodes (i.e., paths or nodes indicting non-speech) may be added to the end of the first hypothesis indicating five more frames of non-speech. If the first hypothesis then predicts a frame including speech, the counter may be reset to zero and a phoneme path/node may be added to the end of the first hypothesis. Thus, at any particular point in speech processing, the system may either look at a particular counter to determine an amount of non-speech predicted by a hypothesis immediately prior to the particular point. The system may also count a number of non-speech paths/nodes immediately prior to the particular point in order to determine an amount of non-speech predicted by a hypothesis. Pause duration for a single hypothesis relative to a current point in ASR processing may also be calculated as the number of consecutive frames for which the hypothesis has been in a non-speech state immediately preceding the current point, or zero if the hypothesis is currently in a speech state. Other methods for determining/estimating non-speech predicted/seen for a particular hypothesis are also possible. Further, other metrics for duration of non-speech (beyond, for example, frames) may also be used.

The system may determine an endpoint based on non-speech as predicted by a hypothesis. For example, the system may determine that a single hypothesis (for example, a top scoring hypothesis) shows non-speech (for example, a certain amount of non-speech beyond a threshold) and therefore the system may declare an endpoint. However, it may also be desirable to make the endpointing decision based on the non-speech predicted by many different hypotheses, thereby smoothing any potential effects of outlier hypotheses. Thus, instead of basing an endpointing decision on a single pause duration of a single hypothesis, the system may determine an expected pause duration, which is an estimated pause duration as calculated by looking at multiple hypotheses and potentially weighting each respective pause duration based on the confidence associated with the respective hypothesis of each respective pause duration. To obtain an expected pause duration for an utterance across multiple hypotheses, the system may thus consider the probability or score of each individual hypothesis and weight the pause duration of each hypothesis using the hypothesis' respective probability. The system may then group all the weighted pause durations to determine an overall pause duration for the audio data under consideration. This overall pause duration may be referred to as the expected pause duration. Thus, by assigning a probability to a hypothesis and computing the weighted average of pause durations over active hypotheses, the system may derive the expected pause duration. The system may further define the overall expected pause duration or hypotheses at an end state by calculating the expected pause duration only over hypotheses that are currently in a language model end state. As explained below, when the expected pause duration and/or expected pause duration at utterance end are beyond certain threshold(s), the system may determine an endpoint, thus allowing the system to complete speech processing and return a recognition result for the entire utterance. Determination of the expected pause duration, the expected pause duration for hypotheses at an end state, and other endpointing may be performed, for example by an endpointing module 1290 in communication with an ASR module 250.

As explained above, each audio frame, the ASR search space is expanded based on the given decoding graph/lattice, which includes both an acoustic model (AM) score and a language model (LM) score. The acoustic and language scores are accumulated along the decoding path for individual hypotheses. For present purposes, let $X_t = \{x_1, x_2, x_3, \ldots, x_t\}$ be the sequence of audio frames until time (or audio frame) t and let $S_t^i = \{s_1^i, s_2^i, s_3^i, \ldots, s_t^i\}$, $i = [1, N_t]$ be the state sequence of the ith active hypothesis at time t. For any given time t, $N_t$ is the number of active hypotheses. The posterior (i.e., confidence) of the hypothesis can be presented as:

$$P(S_t^i \mid X_t) = \frac{P(s_t^i \mid x_t)}{P(s_t^i)} P(s_t^i \mid s_{t-1}^i) P(S_{t-1}^i \mid X_{t-1}) \quad \text{(Equation 1)}$$

where $P(s_t^i \mid x_t) / P(s_t^i)$ is the acoustic score using the posterior generated by the ASR module and normalized by the state prior. $P(s_t^i \mid s_{t-1}^i)$ is the multiplication of language model probabilities and HMM transition probabilities. $L_t^i$ denotes the pause duration for the i-th hypothesis. $L_t^i$ may be measured in frames or in time units (ms, etc.) $L_t^i$ may also be defined as the largest integer N such that $s_{t-N+1}^i \in S_{NS} \wedge \ldots \wedge s_t^i \in S_{NS}$ holds, where $S_{NS}$ denotes the set of all non-speech states. Thus, if at time t−N, hypothesis i saw speech, then began seeing non-speech at time t−N+1. Thus, at time t (which is the time at which a determination is made), hypothesis i has been seeing non speech for N time units. The pause duration $L_t^i$ for a given hypothesis i can be derived from a traceback through the decoding graph kept by the decoder. The input label of each arc in the decoding graph can be mapped to an HMM state representing a context dependent phone, and hence can be further mapped to the speech or non-speech case. A non-speech frame represents a pause and such frames may be cumulatively added to arrive at the pause duration $L_t^i$ for a particular hypothesis i at a particular time t. As noted above, once the hypothesis encounters a speech frame, L for that hypothesis may be reset to zero.

In one embodiment, the system may determine the experienced pause duration, $L_t^i$ for the top scoring language model (LM) hypothesis i=Top scoring LM hypothesis, thus calculating $L_t^{TOP}$. The system may declare an endpoint If $L_t^{TOP}$ exceeds a certain threshold, called $T_{end}$ and the top scoring LM hypothesis is in an end state ($S^{TOP} \in S_{end}$ or $s_t^{TOP} = S_{end}$). Thus, for making the endpoint decision the endpointing module 1290 may consider only hypotheses being in a language model end state, and among these hypotheses the endpointing module may select the best scoring one. The endpointing module 1290 determines an endpoint has been reached if the selected hypothesis is the overall best hypothesis as indicated in Equation 2 below and if the pause duration of the overall best hypothesis exceeds a threshold, as indicated in Equation 3 below.

$$\operatorname*{argmax}_{i, s_t^i \in S_{end}} P(S_t^i \mid X_t) = \operatorname*{argmax}_i P(S_t^i \mid X_t), \quad \text{(Equation 2)}$$

$$L_t^i > T_{end} \text{ with } i := \operatorname*{argmax}_{i, s_t^i \in S_{end}} P(S_t^i \mid X_t), \quad \text{(Equation 3)}$$

The pause duration threshold $T_{end}$ may be tunable and thus configured to a value determined to achieve a certain desired system performance with regard to endpoint detection. Under certain conditions, an edge case may appear when the language model fails to correctly predict the end of the sentence. In that case the probability of the best non-sentence end hypothesis continuous to prevail and the endpoint detector doesn't trigger. This case can be solved by alternatively triggering detection of an endpoint if the pause duration of the overall top scoring (i.e., best) hypothesis exceeds a threshold, regardless of whether the top scoring hypothesis is in an end state. This alternative end state detection is described below in Equation 4.

$$L_t^i > T \text{ with } i := \underset{i}{\arg\max} P(S_t^i \mid X_t), \qquad \text{(Equation 4)}$$

where T is chosen such that $T > T_{end}$. The endpointing of Equations 2 and 3 may be used in conjunction with the endpointing of Equation 4, so that Equation 4 serves as a fallback to Equations 2 and 3, thus preventing a situation where the system never declares an endpoint when the language model never reaches an end state.

This described method of determining endpointing based on the top scoring hypothesis of a language model provides an effective approach to endpoint detection while considering the operation of the language model on the input utterance.

One difficulty with this approach, however, is that the above approach is dependent on what hypothesis is considered the top scoring hypothesis, and that the top scoring hypothesis may change rapidly between processed frames. For example, in an HMM based ASR decoder the language model may correct a particular hypothesis throughout operation of the speech processing engine 258. Further, optimization of the speech processing engine 258 may result in the language model score distribution along a particular path of the lattice taking the form of a non-smooth step function. Other factors such as noise, etc. may contribute to rapid switching between "top" hypotheses. To account for fluctuations between different hypotheses being the top scoring hypothesis, and corresponding complications to the endpointing system, the system may consider a plurality of active hypotheses to arrive at an expected pause based endpoint detection, as described below. Although the expected pause based endpoint detection below is described as using all active hypotheses, a subset of active hypotheses may also be considered, for example, active hypotheses above a certain score threshold, only a certain number of active hypotheses, etc. These variations are not expressly discussed below, but should be considered as part of the described method as an alternative to considering all active hypotheses as illustrated below.

As noted above, a speech recognition engine 258 may consider many active hypotheses when determining ASR output. For example, several thousand hypotheses may be active at any particular point during the ASR processing. Each particular hypothesis is associated with a score/probability P. Each particular hypothesis i also has some length of silence or non-speech $L_t^i$ detected at any particular point in time t, where L is a running tally of how much uninterrupted non-speech preceded time t for the particular hypothesis i. For example, L may be 5 frames of uninterrupted non-speech prior to time t, in which case L may be a value of 5 (or may be a value of 125 ms if 25 ms frames are used).

In another example, L may be 0 if the most recent frame for a particular utterance was a frame that included speech. The system may consider the value of L for each active hypothesis, weighted by each hypothesis' respective probability, to arrive at an overall picture of the pause at a particular moment in time, the expected pause duration. Thus, the expected pause duration D at time t may be represented by a sum of pause durations $L_t^i$ across hypotheses i where each duration is multiplied by the normalized probability (i.e., posterior probability) $P(S_t^i \mid X_t)$ at time t for each hypotheses I at that particular state $S_t^i$ and audio frame $X_t$. The expected pause duration function is shown below in Equation 5.

$$\mathbb{D}(L_t) := \sum_i L_t^i P(S_t^i \mid X_t), \qquad \text{(Equation 5)}$$

which can be interpreted as an expectation of the pause duration computed over all active decoding hypotheses. Smoothing the pause duration by considering the active hypotheses makes the value less sensitive to changes in the best decoding hypothesis. Thus the summed weighted pause durations of Equation 5 may provide a more robust determiner for pause duration of the input audio at time t. Because the cumulative probabilities of all hypotheses is typically below a known number (for example 1, 1000, or some other number depending on system configuration), and the individual probability of any particular hypothesis is under that known number, the expected pause duration D of Equation 5 may be considered a weighted average expected pause duration across active hypotheses.

While D of equation 5 illustrates the expected pause duration for active hypotheses under consideration, the system may also consider the expected pause duration at utterance end, that is calculating the expected pause duration but only for active hypotheses which have reached an end state in the language model. This expected duration, $D_{end}$ is illustrated in Equation 6.

$$\mathbb{D}_{end}(L_t) := \sum_{i, s_t^i \in S_{end}} L_t^i P(S_t^i \mid X_t) \qquad \text{(Equation 6)}$$

The expected pause duration at utterance end $D_{end}$ of Equation 6 may be considered a weighted average expected pause duration across active hypotheses at an end state. As may be appreciated, $D \geq D_{end}$ as D includes active hypotheses but $D_{end}$ only includes active hypotheses are in an end state. For pauses in the middle of an utterance, the value of $D_{end}$ will remain small. But as the length of a pause in input audio increases, more active hypotheses under consideration will reach an end state, and the value of $D_{end}$ will converge to the value of D, thus reaching $D = D_{end}$ when all active hypotheses are in an end state.

Using the above equations, the endpointing module 1290 may determine an endpoint if either of two situations occurs:
1. $\mathbb{D}_{end}(L_t) > T_{end}$ and $\mathbb{D}(L_t) > T'$, or
2. $\mathbb{D}(L_t) > T$ The first condition of situation 1 is that the expected pause duration at utterance end, $D_{end}$, has reached a certain threshold $T_{end}$. Thus, if the expected pause duration experienced by the number of active hypotheses at an end state crosses threshold $T_{end}$, then the first condition of situation 1 is met. The second condition of situation 1 is that the expected pause duration of active hypotheses (regardless of hypothesis state) has reached a certain threshold T'. Thus, if the expected pause duration experienced by all active hypotheses crosses threshold T', then the second condition of situation 1 is met. This second condition serves as a check on the first condition to avoid a mid-utterance pause accidentally resulting in an endpoint being triggered. Referring again to the examples discussed above in reference to FIG. 9, if the beginning of an utterance is "what is the weather [pause]", depending on the pause length a number of hypotheses may not yet have reached an end state. The second condition safeguards against prematurely declaring an endpoint in response to a mid-utterance pause, which may result when a language model fails to correctly predict the end of an utterance. If both the first condition and second condition of situation 1 are met, then an endpoint may be declared. Alternatively, the system may declare an endpoint if only the first condition of situation 1 is met or if the second condition of situation 1 is met, but it may be preferable to declare an endpoint when both conditions of situation 1 are met.

Condition 2 acts as an endpointing safety valve, similar to that discussed above with reference to endpointing based on the best hypothesis. If the speech recognition engine 258 encounters errors, the system does not want to experience a loop where endpointing never occurs. Thus, a safety threshold T may be configured so that if all active hypotheses crosses threshold T, an endpoint is declared. While the values of T, T', and $T_{end}$ are configurable to arrive at a desired system performance, it can be appreciated that T is larger than and T' and $T_{end}$ in order for T to serve as the safety threshold. The various threshold values may be optimized over a development training data set using machine learning techniques discussed above. Further, while the above techniques may be used with existing language models, during training of language models, language models may be optimized to carefully select end states within hypotheses. For example, a training set of utterances with known end points may be used and the language model may be trained to minimize a cost function of missing the end point. Other such training configurations are also possible.

The above language model based endpointing techniques may be combined with other endpointing techniques, for example VAD techniques. As an example, during processing of a beginning of an utterance, a system may experience false endpointing triggers. To account for this, during onset of speech processing (that is, for a certain duration of time) the system may use VAD techniques to check for an endpoint, and may switch to a language model technique such as described above after the duration passes.

While the above language-model based endpointing techniques may improve system performance, additional improvements may be made when incorporating directional based aspects into speech processing. Such directional techniques may make use of beamforming capabilities available to a device 110 and/or system 100 as described above. In particular, such directional based aspects may be helpful in noisy environments where non-desired audio (that is, audio from some source other than the speaker of the desired utterance) may interfere with the system's speech processing. For example, if a first user is speaking from a first direction a device's beamformer may focus on that first direction to capture speech for processing. If, however, a second user begins speaking from a second direction, the beamformer may switch to the second direction and stay there (if the first user is done speaking) or swing back to the first direction if the first user is not done speaking, is responding to the second user, etc.) depending on the duration of the audio from the second user. If the first user is done speaking, the audio input from the second user may result in a delay in endpointing the utterance of the first user, as the system may treat the audio from the second user as a continuation of the utterance from the first user, thus continuing to progress the language model lattice as discussed above, and adding additional active hypotheses under consideration as a result of the incoming audio from the second user. While the system may ultimately determine that an endpoint occurred after the first user's utterance using the techniques described above, the speech from the second user (or other source of noise) may delay that process. Or, the system may focus on the second user and determine that an endpoint has been reached based on the speech of the second user when the speech from the first user was actually the speech of interest. Neither situation (delayed endpointing or premature endpointing) is desirable.

To improve endpointing, the system may make use of direction-based information that provides the system with further consideration when determining an endpoint of an utterance. The various techniques/embodiments described herein may be used in various combinations either separately or together and, unless stated otherwise, are not intended to be exclusive to each other.

In one embodiment the system may track the direction of incoming audio and may create an indicator of the direction that may be considered during ASR/endpointing. For example, if incoming audio is detected from a first direction as determined by the device 110 (or possibly the server 120), the system may create an indicator of that direction and associate that indicator/direction to the audio data associated with the incoming audio. Thus, when audio data is ultimately processed by the system, the system may know what direction the audio data came from. Further, the system may track audio from a particular direction and may implement a counter or similar timing component to track the duration during which audio was received for a particular direction. The system may then associate the duration with the particular audio data corresponding to that duration. For example, in the example above, when the first user is speaking from the first direction, the system may track how long speech was detected from the first direction. Thus audio data associated with the beginning of the first utterance may be associated with a short duration (for example, from the beginning of the utterance to the time in question at the beginning of the utterance), whereas audio data associated with the end of the first utterance may be associated with a longer duration (for example, from the beginning of the utterance to the time in question later in the utterance). When the system detects audio from the second user, the system may start a new duration counter may start for the second audio from the second direction. And when the system switches back to the audio from the first user, the system may again start a new duration counter for the new audio coming from the first user/first direction.

The duration/direction metrics may be analogized to the system "concentrating" on a speaker. When a wakeword is detected, the beamformer direction indicates a likely direction of the speaker the system should be "concentrating" on. The longer duration that audio comes from that likely direction, the more likely it is the system is still "concentrating" on the desired speaker. If the beamformer rapidly switches direction away from, then back to that direction, the system may determine that the distracting noise is less important to the endpointing consideration and may, using the duration and direction indicators, weigh that noise lower during endpointing.

Figure 10B:
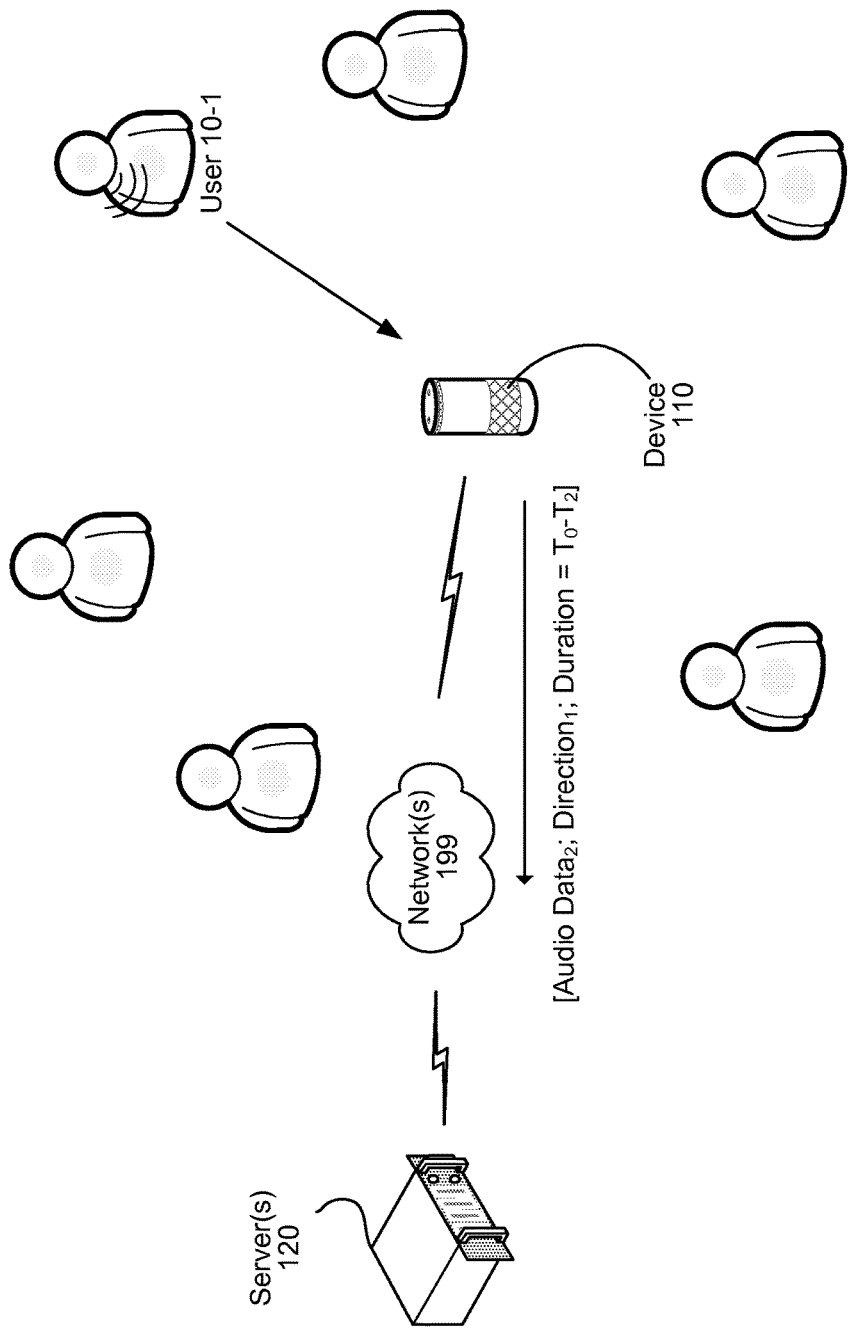

FIGS. 10A-10E illustrate creating indicators of direction and duration and associating them with audio data. As shown in FIG. 10A, a device 110 may be in an environment with many speakers. At time $T_1$ a first user 10-1 may be speaking a command to the device 110. The user may have started speaking at time $T_0$ (not shown). The device 110 may detect the speech and convert the speech into audio data, Audio Data$_1$. The device 110 may also determine a direction the speech was received from, using beamforming or similar components as described above. The device may create an indicator of that direction, Direction$_1$. The device may also track the duration of the speech from user 10-1, which in this case has lasted from time $T_0$ through $T_1$. The device may create an indication of this duration, namely Duration=$T_0$-$T_1$. The audio data, direction, and duration associated with $T_1$ may then be sent by the device 110 to the server 120 across network 199. At time $T_2$, as illustrated in FIG. 10B, the speech from user 10-1 is still continuing, so the device 110 may send audio data from time $T_2$ (Audio Data$_2$), the source speech direction (still Direction$_1$) and the duration (now Duration=$T_0$-$T_2$ as the speech is ongoing) to the server 120. Similarly, for time $T_3$, as illustrated in FIG. 10C, the speech from user 10-1 is still continuing, so the device 110 may send audio data from time $T_3$ (Audio Data$_3$), the source speech direction (still Direction$_1$) and the duration (now Duration=$T_0$-$T_3$) to the server 120.

Figure 10D:
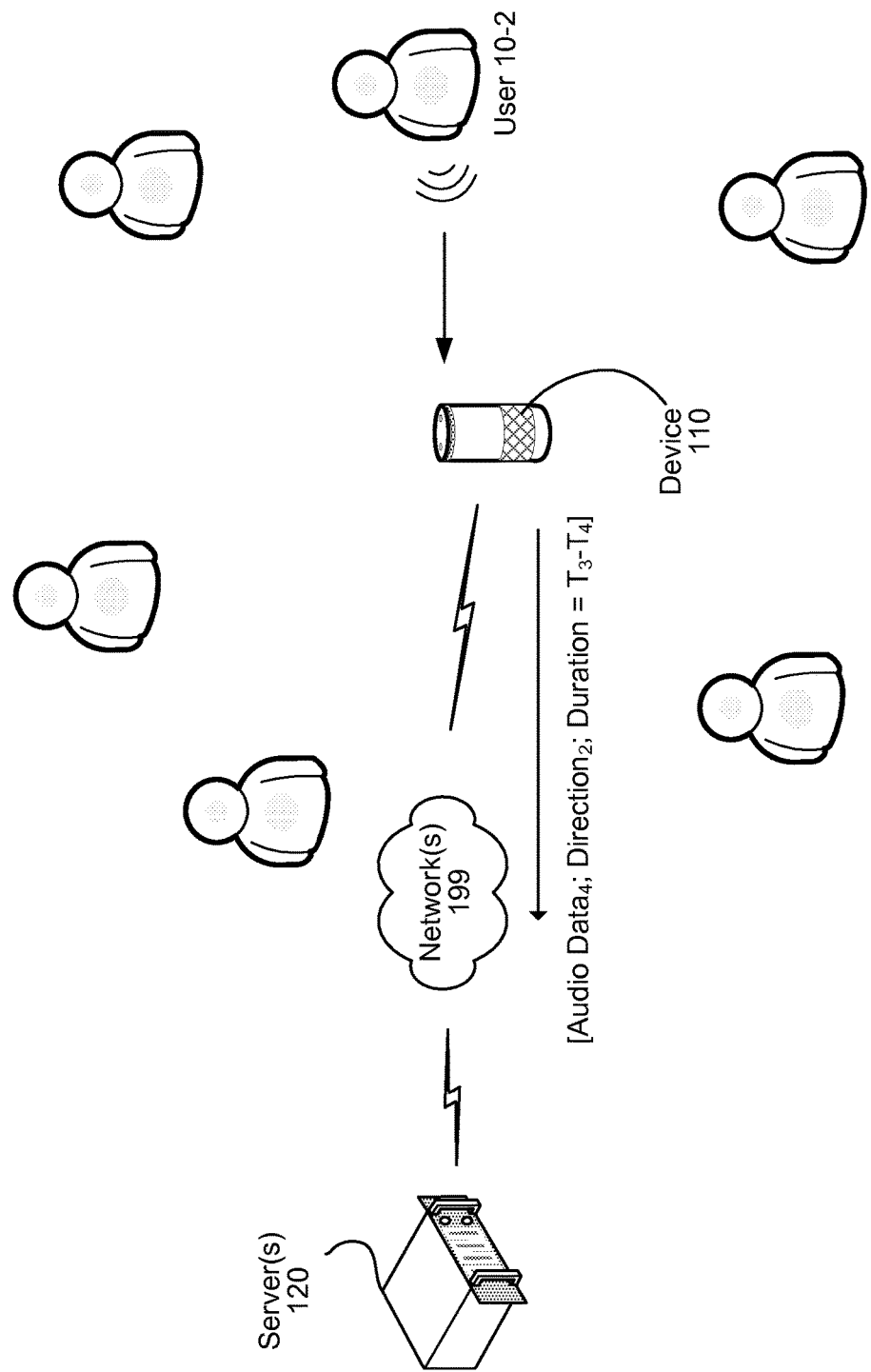

At time $T_3$, however, user 10-1 may stop speaking and another user may begin speaking, thus resulting in the situation of time $T_4$, as illustrated in FIG. 10D. As illustrated in FIG. 10D, user 10-1 has stopped speaking and user 10-2 is now speaking. The new audio data resulting from user 10-2's speech (Audio Data$_4$) may be sent from the device 110 to the server 120 along with an indication of the new direction (now Direction$_2$) and the new duration (now Duration=$T_3$-$T_4$). Further, the device 110 may send the server 120 an indication that a source direction of the incoming audio changed at time $T_4$. Then, a third user may begin speaking, as illustrated in FIG. 10E, showing time $T_5$. As shown, the audio data from user 10-2 for time $T_5$ (Audio Data$_{5-A}$) may be sent to the server 120 along with the associated direction (Direction$_2$) and duration (now Duration=$T_3$-$T_5$). Further, the device 110 may send the server 120 an indication that a source direction of the incoming audio changed at time $T_5$. The audio data from user 10-3 (Audio Data$_{5-B}$) may be sent to the server 120 along with the associated direction (Direction$_3$) and duration (now Duration=$T_4$-$T_5$).

The server may receive these various segments of audio data and associated indicators of directions, speech durations, and/or direction changes. When determining endpoints for the various utterances, the system may consider the direction the speech came from along with the duration of the speech from that direction. For example, the server 120 may weight the audio data and/or a calculated pause duration or expected pause duration for endpointing purposes using the direction and/or speech duration information. For example, the speech duration information may be used to create a duration weight factor δ where δ may be used to adjust how much importance data particular expected pause duration should be given based on how long audio has been received from that particular direction. Further, the direction information or direction change information may be used to weight the expected pause duration or to adjust a threshold for purposes of determining an endpoint. A metric Δ may be based on the direction or direction change, for example, Δ may be based on a magnitude of difference in direction between one segment of audio data and another, Δ may be based on a rate of change in direction across multiple audio segments, etc. Δ may also be used to adjust how much importance certain audio data should be given based on direction information. A value for each metric may be determined for each segment of audio data. Thus, values for δ and/or Δ may be included in Equations 5 or 6 above to factor in duration and/or direction information when determining expected pause duration or expected pause duration at end state. The weighting may be logarithmic, linear, or some other weighting configuration. In this manner silence/non-speech frames from the direction of an original utterance, where the original utterance correspond to a high duration of coming from the same direction may be weighted greater for endpointing purposes than non-speech frames coming from a new different direction. Thus, if new speech comes from another direction while other hypotheses are at an end state, the new speech may be less likely to distract the endpointing process away from the end state hypotheses.

In another example of use of direction information, each node of a hypothesis may be associated with a direction from which the audio associated with the node was received. If the system tracks the amount of non-speech associated with a particular hypothesis (for example using one of the techniques described above), and then encounters new speech for the hypothesis where the new speech is coming from a new direction that is different from the preceding speech of the hypothesis, that new speech may be considered as non-speech for purposes of declaring an endpoint. For example, the system may compare a first indication of direction associated with one segment of a hypothesis to a second indication of a direction associated with a second segment of a hypothesis and if the second indication is different from the first indication, the second segment of the hypothesis may be treated as non-speech for endpointing purposes.

Figure 11A:
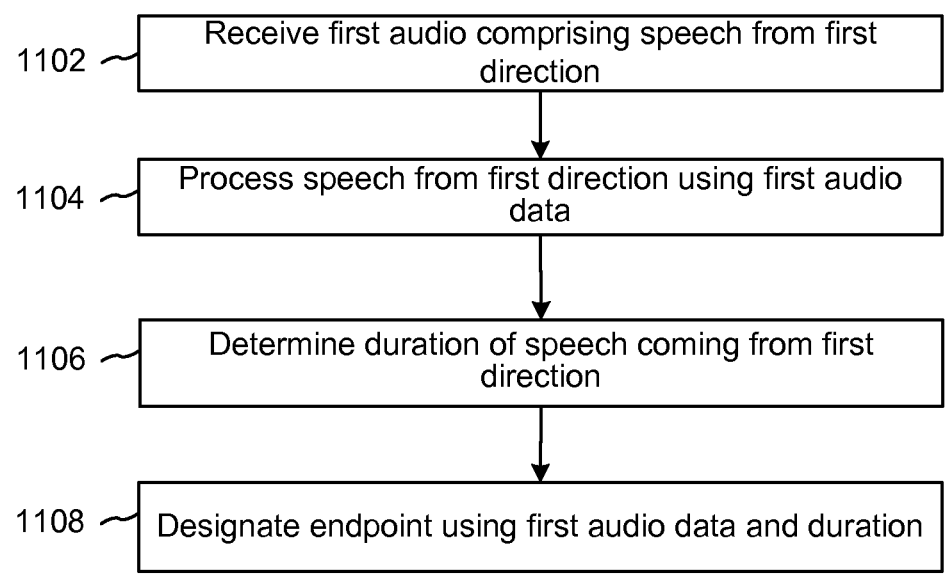
FIG. 11A is a flowchart illustrating determining an endpoint of speech using direction and/or duration information.
Figure 11B:
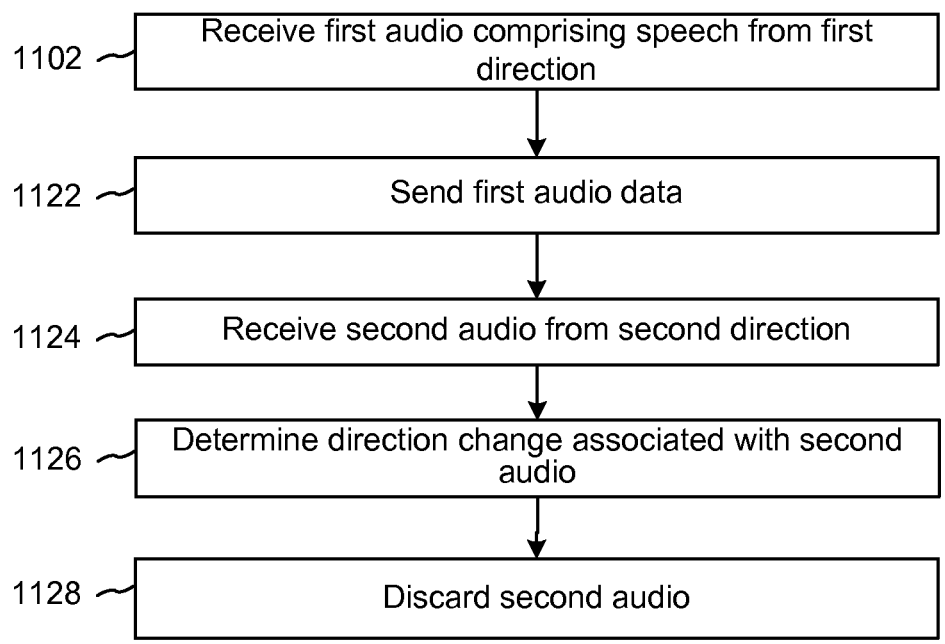
FIG. 11B is a flowchart illustrating filtering audio data based on direction and duration based information.

The indicators of direction and/or duration may be created by the device 110 or the server 120. As shown in FIG. 11A, a system may receive (1102) first audio comprising speech from a first direction. The system may process (1104) speech from the first direction using first audio data determined from the first audio. The system may also determine (1106) a duration of speech coming from the first direction. The system may designate (1108) an endpoint using the first audio data and duration. If new speech comes from a second direction, the system may take certain steps to discard the new speech if it is determined that it will interfere with current speech processing and/or endpointing. For example, the device 110 may take certain steps to reduce overall system latency by only sending to the server 120 audio that is likely associated with the desired utterance to be processed. For example, if a wakeword is directed from a first direction, and the device 110 continues to receive speech from that first direction (such that the duration crosses a threshold), if new second audio is detected from a different second direction and such second audio has a duration under a threshold, the device 110 may determine not to send data corresponding to that second audio to the server 120 for further processing as the second audio is likely not important to the utterance and sending it would only cause the system to experience higher latency by processing unnecessary data. Thus, as shown in FIG. 11B, a device 110 may receive (1102) first audio comprising speech from a first direction and may send (1124) first audio data associated with the first audio, for example to a server 120 for further processing. The device may then receive (1124) second audio from a second direction and determine (1126) a direction change associated with the second audio. The device 110 may then discard (1128) the second audio based on the direction change.

To determine what data to send to the server, a machine learning model may be trained during a training process and implemented locally on a device 110. The model may consider factors such speech direction, duration, wakeword direction, other speech direction/duration, etc. to determine whether to send certain speech data to the server or whether to discard it. Further, the model may consider whether the speech is occurring in a noisy environment.

The indicators of direction and/or duration may be particularly useful in noisy environments, namely environments where the signal-to-noise ratio (SNR) is low (or the signal is otherwise poor quality) or environments where the beamformer switches direction repeatedly due to sources of audio in multiple directions. For example, when SNR is high and there are fewer noise sources in an environment, the beamformer is more likely to remain steady when a user is not moving. If a user is move, the direction changes at a smooth rate. In low SNR environments the beamformer direction of focus may change rapidly, which the system can track using the direction and duration metrics discussed above. In such a low SNR case, the number of direction changes, the magnitude of direction changes, and the shorter durations between these changes may cause a lower weighting on the decision to end the utterance, as the more rapid changes may indicate the presence of a noisy environment rather than the end of an utterance and the beginning of another.

In a low SNR environment, or in other sub-optimal conditions (for example, close hard surfaces that cause acoustic interference, multiple speakers, etc.) the system may have difficulty maintaining an uninterrupted beamforming direction pointing at the speaker. In such "bouncy" situations, the endpointing module 1290 may be tuned to a more aggressive setting (that is, be more likely to declare an endpoint), as endpointing in such environments may be difficult. An example of a more aggressive setting would be to lower certain thresholds, such as those discussed above, to declare an endpoint. Thus, if a detected noise is below a certain noise threshold (or if signal quality or SNR is above a signal quality/SNR threshold) the system may select higher tuned endpoint thresholds (for example, may select a higher pause duration threshold) thus resulting in endpointing occurring with a higher pause/non-speech duration. Alternatively, the endpointing module 1290 may be tuned to a less aggressive setting (i.e., a lower tuned endpoint/pause duration threshold is selected) in a low SNR scenario (i.e., when the SNR is below an SNR threshold) as different endpointing may be desired when there is more uncertainty regarding various audio sources. Machine learning techniques may be used to create a model to tune various settings of the endpointing module 1290 (including the thresholds discussed above) based on SNR settings as well as duration/direction of detected audio. Further, the weights placed on audio based on direction/duration may be adjusted under certain SNR conditions. For example, in a low SNR environment, the system may place higher weights on audio from previously established directions (i.e., those with high durations), and lower weights on new audio directions (i.e., those with low durations).

An indicator of the duration and/or direction may be sent to a downstream component, for example an NLU module 260 and/or command processor 290 that may be used to perform other functions, for example interpreting or processing utterance text differently depending on the duration and/or direction of a detected utterance.

The various endpointing techniques described above mechanism may use machine learning model techniques described above. For example, a classifier (such as an SVM) or other model may be trained to determine an end point based on both the pause of the best hypothesis and the expected pause duration across multiple active hypotheses (including, potentially, active hypotheses at an end state). The classifier may also be trained to process multiple utterances simultaneously. The classifier may be trained using a number of support vectors with a number of different training utterances/end points representing audio data, pause durations, etc. Different models may also be trained to determine how the system should use the duration/direction information to weight the endpointing processes. Different environments may respond better to different responses to the duration/direction information. Machine learning and training techniques may optimize such considerations for implementation by the system.

Figure 12:
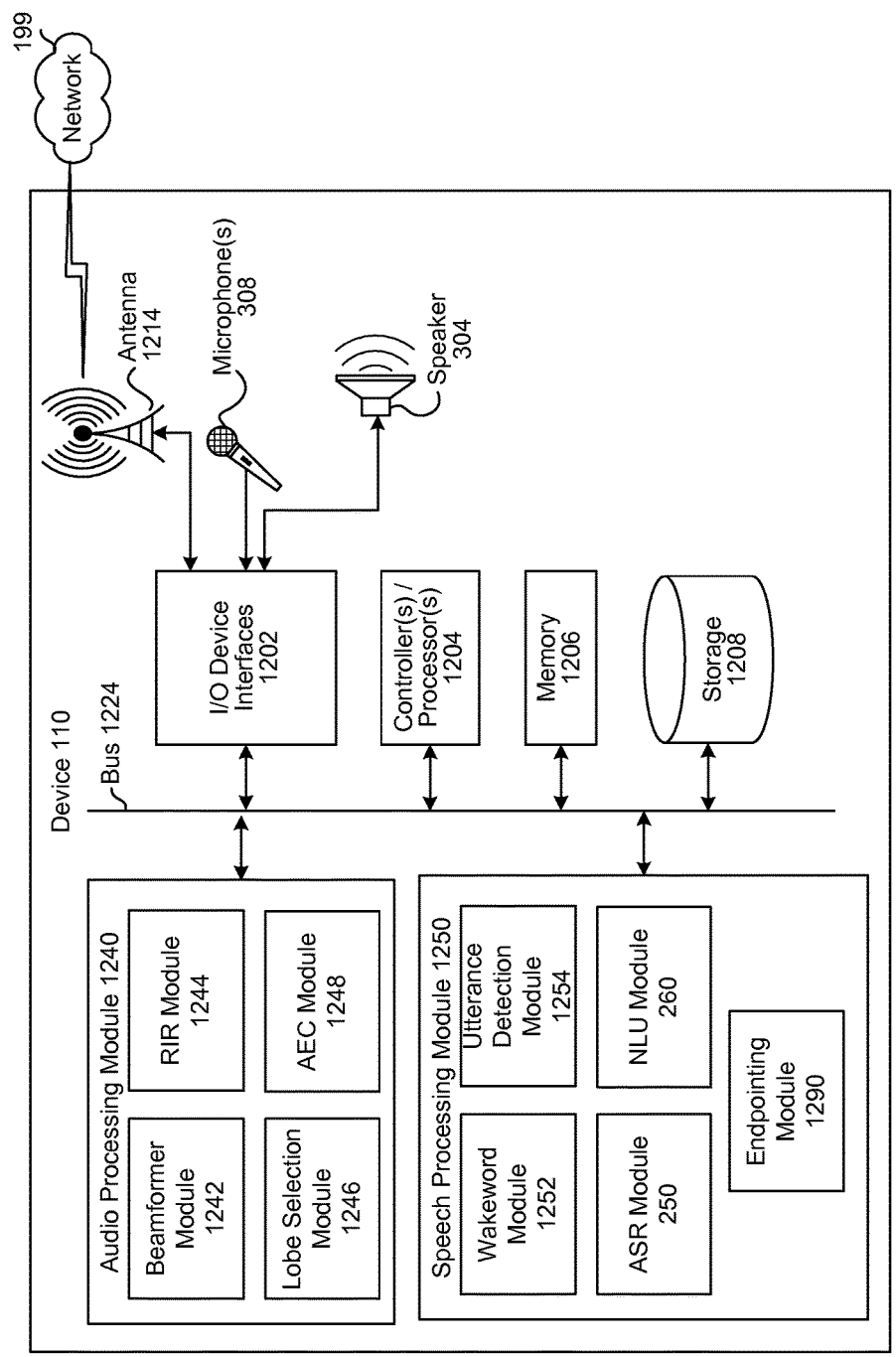
FIG. 12 is a block diagram conceptually illustrating example components of a device according to embodiments of the present disclosure.
Figure 13:
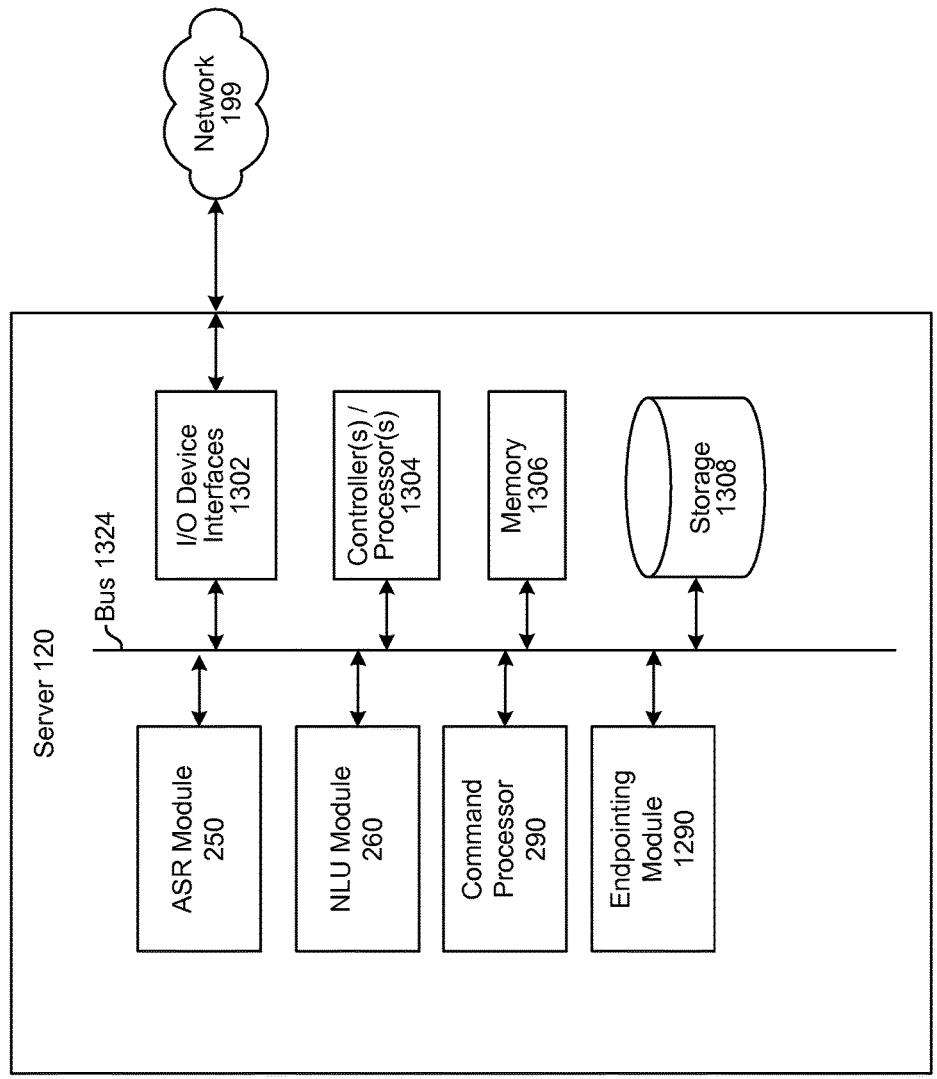
FIG. 13 is a block diagram conceptually illustrating example components of a server according to embodiments of the present disclosure.

FIG. 12 is a block diagram conceptually illustrating a local device 110 that may incorporate certain speech receiving/processing capabilities. FIG. 13 is a block diagram conceptually illustrating example components of a remote device, such as a remote server 120 that may assist with ASR and/or NLU processing. Multiple such remote devices may be included in the system, such as one remote device for ASR, one remote device for NLU, etc. In operation, each of these devices may include computer-readable and computer-executable instructions that reside on the respective device (110/120), as will be discussed further below.

Each of these devices (110/120) may include one or more controllers/processors (1204/1304), that may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive (MRAM) and/or other types of memory. Each device may also include a data storage component (1208/1308), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1202/1302).

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces, as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to the speech-controlled appliance 110 in FIG. 12, the input/output device interfaces 1202 connect to a variety of components such as a microphone 308 or microphone array 302, a speaker or speaker(s) 304, an one or more antennas 1214 supporting wireless communication. Via the antenna(s), the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

As illustrated, the device 110 may include, or otherwise have access to an audio processing module 1240. The audio processing module 1240 may include a beamformer module 1242, a room impulse response (RIR) determination module 1244, a lobe-selection module 1246, and an acoustic echo cancellation (AEC) module 1248.

The beamformer module 1242 functions to create beampatterns, or effective directions of gain or attenuation. As illustrated and described below, the beampatterns include multiple lobes, each altering a gain from a respective region within the environment of the device 110. The beamformer module 1242 may be configured to create an indicator of a direction of received audio for consideration by the speech processing system either local to the device 110 or at a remote server 120, to which the device 110 may send the indicator of the direction of the received audio. The indicator of a direction may indicate a direction relative to the device 110, a particular beam and/or lobe determined by the beamformer module 1242, or some other indicator. The beamformer module 1242 and/or other component (either of device 110 or of server 120) may also be configured to track the duration over which a particular audio source was detected, for example an audio source associated with a first direction as detected by the device 110. The system may then send an indicator of that duration from the device 110 to the server 120, and/or may incorporate that duration into the endpointing process discussed above.

The RIR determination module 1244, meanwhile, may function to determine a room impulse response (RIR) of the environment relative to the device 110 and may store the RIR in the storage 1208. In some instances, the module 1244 associates each RIR with a timestamp such that a history of the RIRs of the environment is maintained. To determine an RIR, the module 1244 may instruct the speaker 304 to emit a known sound within the environment. The microphones 1218 then capture sound of the known sound that is reflected by the environment (e.g., off walls, the ceiling, the floor, objects, etc.). The microphones 1218 may then capture an audio signal based on this reflected sound and the RIR determination module 1244 may compare the known sound to the reflected sound represented by the captured audio signal to identify variations there between. The RIR determination module 1244 then calculates an RIR of the environment based on these variations and stores this information in the storage 1208. As is known, this measured RIR may indicate a level of echo coming from different directions relative to the device 110, which aids in the device 110 determining if it is near a wall, corner, or other object that occupies a lobe of a particular beampattern.

The lobe-selection module 1246, meanwhile, functions to select one or more lobes of a beampattern to enhance based on the RIR of the environment, described above, as well as with reference to a history of lobes that have previously been found to include user speech. For instance, because the RIR may indicate when the device 110 is near a wall or other occluding object, and the direction of that wall or object relative to the device 110, the lobe-selection module may take that into account when determining which lobes of a beampattern to enhance.

In addition to referencing the RIR, the lobe selection module 1246 may reference a history of which lobes have previously been found to include user speech. That is, if particular lobe(s) of a beampattern correspond to regions of an environment that have been found to often include user speech, then the lobe selection module 1246 may increase the likelihood that these particular lobes will be enhanced. For instance, the lobe-selection module 1246 may analyze the storage 1208 to identify which lobes have previously been found to include user speech a threshold number of times or a threshold percentage of the time. Additionally or alternatively, the module 1246 may identify the lobe(s) that have most recently been found to include user speech (e.g., may identify the lobe that was last found to include user speech).

The lobe-selection module 1246 may then use the RIR measurement, the heuristics associated with previous lobe-selections, and an amount of energy associated with each lobe to select one or more lobes to enhance. The AEC module 1248 may perform echo cancellation. The AEC module 1248 compares audio that is output by the speaker(s) 1216 of the device 110 with sound picked up by the microphone array 302 (or some other microphone used to capture spoken utterances), and removes the output sound from the captured sound in real time. Echo cancellation is commonly used by cellular telephones and other telephones operating as speaker phones, and facilitates the ASR process by removing a component of captured sounds that can interfere with speech recognition. The AEC module 1248 may also work with other components, for example may apply more processing resources to preparing the portion of the audio signal corresponding to the selected lobes as compared to a remainder of the audio signal. Although illustrated as part of the audio processing module 1240, the AEC, and/or it functionality may be located elsewhere, for example in ASR module 250, ASR module 1256, etc. The output of the audio processing module 1240 may be sent to the AFE 256, to the speech processing module 1250, or to other components.

The device 110 includes a speech processing module 1250 which may operate in conjunction with the audio processing module 1240. The speech processing module 1250 may include a wakeword detection module 1252. The wakeword detection module may perform wakeword detection as described above. The speech processing module 1250 may include a utterance detection module 1254. The utterance detection module 1254 (or some other component) may also be configured to perform beginpoint detection and/or endpoint detection as described above.

The speech processing module 1250 may include an ASR module 250. The storage 1208 may include ASR models 252 used by the ASR module 250. If limited speech recognition is included, the speech recognition engine within ASR module 250 may be configured to identify a limited number of words, such as wake words of the device, whereas extended speech recognition may be configured to recognize a much larger range of words. The device may also include a limited or extended NLU module 260 that may include certain NLU functions or may include expanded NLU functionality, such as described above in reference to NLU module 260. Storage 1208 may also include an NLU knowledge base 272 and/or entity library 282. The device may also include an endpointing module 1290 to perform endpointing using hypotheses as described above. The device may also include a command processor 290 for further execution of spoken commands.

As illustrated in FIG. 13, one or more servers 120 may include the ASR module 250, the NLU module 260, endpointing module 1290 and/or a command processor 290. The command processor 290 may be configured to execute commands associate with an utterance.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 12 and 13, are exemplary, and may be located a stand-alone device or may be included, in whole or in part, as a component of a larger device or system.

Figure 14:
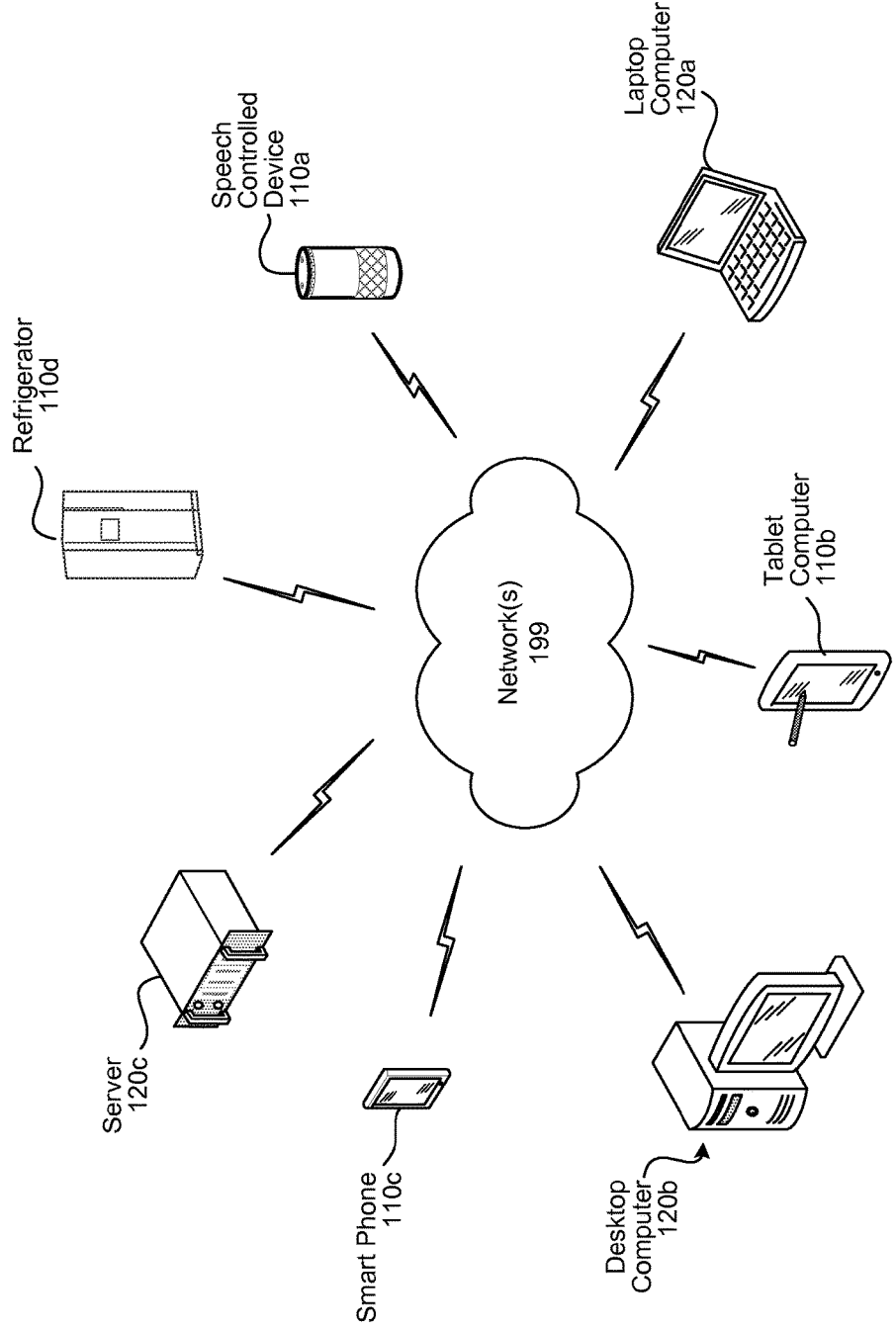
FIG. 14 illustrates an example of a computer network for use with the system.

As illustrated in FIG. 14, multiple devices (110a-110d and 120a-120c) may contain components of the system 100 and the devices may be connected over a network 199. The network 199 is representative of any type of communication network, including data and/or voice network, and may be implemented using wired infrastructure (e.g., cable, CATS, fiber optic cable, etc.), a wireless infrastructure (e.g., WiFi, RF, cellular, microwave, satellite, Bluetooth, etc.), and/or other connection technologies. Devices may thus be connected to the network 199 through either wired or wireless connections. Network 199 may include a local or private network or may include a wide network such as the internet. For example, a speech controlled device 110a, a tablet computer 110b, a smart phone 110c, and a refrigerator 110d may be connected to the network 199 through a wireless service provider, over a WiFi or cellular network connection or the like. Other devices are included as network-connected support devices, such as laptop computer 120a, desktop computer 120b, and a server 120c. The support devices 120 may connect to the network 199 through a wired connection or wireless connection. Networked devices 110 may capture audio using one-or-more built-in or connected microphones 1218 or audio capture devices, with processing performed by ASR, NLU, or other components of the same device or another device connected via network 199, such as an ASR 250, NLU 260, etc. of one or more servers 120c.

The concepts disclosed herein may be applied within a number of different devices and computer systems, including, for example, general-purpose computing systems, speech processing systems, and distributed computing environments. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for determining an utterance endpoint during automatic speech recognition (ASR) processing, the method comprising:
   receiving audio comprising speech;
   determining audio data based on the audio;
   determining a source direction corresponding to the audio data;

determining a duration associated with the audio data, wherein the duration indicates how long the audio has been continuously received from the source direction;
performing ASR processing on the audio data to determine:
a plurality of hypotheses, wherein each hypothesis of the plurality of hypotheses includes at least one word or a representation of at least one word potentially corresponding to the audio data, and
for each of the plurality of hypotheses, a respective probability that the respective hypothesis corresponds to an utterance represented in the audio data;
determining, for each of the plurality of hypotheses, a representation of a respective number of audio frames corresponding to non-speech immediately preceding a first point;
calculating, for each of the plurality of hypotheses, a respective weighted pause duration by multiplying the respective probability of a respective hypothesis by the respective number of audio frames of the respective hypothesis;
calculating a cumulative expected pause duration by summing the respective weighted pause durations for each of the plurality of hypotheses;
calculating an adjusted cumulative score using the cumulative expected pause duration; and
designating the first point as corresponding to a likely endpoint as a result of the adjusted cumulative score exceeding a first threshold.

2. The computer-implemented method of claim 1, further comprising:
configuring a first non-speech duration threshold;
configuring a second non-speech duration threshold, wherein the second non-speech duration threshold requires fewer non-speech frames than the first non-speech duration threshold to declare an endpoint;
determining a signal-to-noise ratio (SNR) associated with the audio data;
determining that the SNR is below a SNR threshold; and
in response to determining that the SNR is below the SNR threshold, selecting the second non-speech duration threshold as the first threshold.

3. The computer-implemented method of claim 1, further comprising:
receiving second audio data;
determining a second source direction associated with the second audio data;
determining a second duration indicating how long second audio corresponding to the second audio data has been continuously received from the second source direction;
determining that the source direction is different from the second source direction; and
discarding the second audio data in response to the second duration being under a second threshold.

4. The computer-implemented method of claim 1, wherein the plurality of hypothesis comprises a first hypothesis, and the method further comprises:
associating the source direction with a first segment of the first hypothesis;
receiving second audio data;
determining a second source direction associated with the second audio data;
performing ASR processing on the second audio data to determine a second segment of the first hypothesis;
associating the second source direction with the second segment of the first hypothesis;
determining that the first segment is associated with a different direction from the second segment; and
treating the second segment as corresponding to non-speech for purposes of determining the respective number of audio frames corresponding to non-speech of the first hypothesis.

5. A computer-implemented method comprising:
determining that received audio data corresponding to at least one utterance includes first audio data, wherein the first audio data corresponds to a first source direction;
performing automatic speech recognition processing on the first audio data to determine a first hypothesis including one or more of at least one first word or a representation of at least one first word potentially corresponding to the first audio data;
determining that a first portion of the first audio data corresponds to speech;
determining a first value representing a first time duration of the first portion of the first audio data;
determining a first duration weight factor based at least in part on the first value;
determining, in the first hypothesis, a representation of first non-speech, the first non-speech following the first portion of the first audio data;
determining a second value representing a second time duration of the first non-speech;
determining a first pause duration value by using the first duration weight factor to adjust the second value; and
determining an endpoint based at least in part on the first pause duration value.

6. The computer-implemented method of claim 5, wherein determining the endpoint is further based on a first threshold and the method further comprises:
determining a signal-to-noise ratio (SNR) associated with the first audio data; and
selecting the first threshold based on the SNR.

7. The computer-implemented method of claim 6, further comprising one of:
selecting a first SNR threshold as the first threshold when the SNR is above an SNR threshold; or
selecting a second SNR threshold as the first threshold when the SNR is below an SNR threshold, wherein the second SNR threshold is lower than the first SNR threshold.

8. The computer-implemented method of claim 5, wherein determining the first duration weight factor uses a trained model configured to calculate how much weight to give the second value based on the first value.

9. The computer-implemented method of claim 5, wherein determining the endpoint further comprises:
determining, based at least in part on the first pause duration value, an expected pause duration value; and
determining that the expected pause duration value has exceeded a threshold.

10. The computer-implemented method of claim 5, further comprising determining the second value by determining a number of audio frames corresponding to the first non-speech represented in the first hypothesis.

11. The computer-implemented method of claim 5, wherein the first hypothesis comprises at least one node representing a number of audio frames corresponding to the first non-speech.

12. The computer-implemented method of claim 5, wherein:
performing automatic speech recognition processing on the first audio data further comprises calculating a first probability that the first hypothesis corresponds to an utterance represented in the first audio data; and determining the first pause duration value further comprises determining the first pause duration value based at least in part based on the first probability.

13. The computer-implemented method of claim 12, wherein determining the first pause duration value further comprises multiplying the first probability by a factor corresponding to the second value.

14. The computer-implemented method of claim 5, further comprising:

determining that the received audio data corresponding to the at least one utterance further includes second audio data corresponding to a second source direction, the second source direction being different than the first source direction; and processing the second audio data to determine a second pause duration value, wherein determining the endpoint comprises determining the endpoint based at least in part on the first pause duration value and the second pause duration value.

15. The computer-implemented method of claim 14, wherein processing the second audio data to determine the second pause duration value further comprises:

performing automatic speech recognition processing on the second audio data to determine a second hypothesis including one or more of at least one second word or a representation of at least one second word potentially corresponding to the second audio data;

determining that a second portion of the second audio data corresponds to speech;

determining a third value representing a third time duration of the second portion of the second audio data;

determining a second duration weight factor based at least in part on the third value;

determining, in the second hypothesis, a representation of second non-speech, the second non-speech following the second portion of the second audio data;

determining a fourth value representing a fourth time duration of the second non-speech; and determining the second pause duration value by using the second duration weight factor to adjust the fourth value.

16. The computer-implemented method of claim 15, wherein:

performing automatic speech recognition processing on the first audio data further comprises calculating a first probability that the first hypothesis corresponds to an utterance represented in the first audio data;

determining the first pause duration value further comprises determining the first pause duration value based at least in part on the first probability;

performing automatic speech recognition processing on the second audio data further comprises calculating a second probability that the second hypothesis corresponds to an utterance represented in the second audio data; and determining the second pause duration value further comprises determining the second pause duration value based at least in part on the second probability.

17. The computer-implemented method of claim 15, further comprising:

determining that the first value is greater than the third value; and based at least in part on determining that the first value is greater than the third value, setting the first duration weight factor to be greater than the second duration weight factor.

18. The computer-implemented method of claim 15, further comprising:

discarding the second audio data in response to the third value being under a threshold.

19. A computing system comprising:

at least one processor; and a computer-readable medium encoded with instructions operable to be executed by the at least one processor to cause the computing system to perform a set of actions comprising:

determining that received audio data corresponding to at least one utterance includes first audio data, wherein the first audio data corresponds to a first source direction;

performing automatic speech recognition processing on the first audio data to determine a first hypothesis including one or more of at least one first word or a representation of at least one first word potentially corresponding to the first audio data;

determining that a first portion of the first audio data corresponds to speech;

determining a first value representing a first time duration of the first portion of the first audio data;

determining a first duration weight factor based at least in part on the first value;

determining, in the first hypothesis, a representation of first non-speech, the first non-speech following the first portion of the first audio data;

determining a second value representing a second time duration of the first non-speech;

determining a first pause duration value by using the first duration weight factor to adjust the second value; and determining an endpoint based at least in part on the first pause duration value.

20. The computing system of claim 19, wherein determining the endpoint is further based on a first threshold and the computer-readable medium is encoded with additional instructions operable to be executed by the at least one processor to further cause the computing system to:

determine a signal-to-noise ratio (SNR) associated with the first audio data; and select the first threshold based on the SNR.

21. The computing system of claim 20, wherein the computer-readable medium is encoded with additional instructions operable to be executed by the at least one processor to further cause the computing system to:

select a first SNR threshold as the first threshold when the SNR is above an SNR threshold; or select a second SNR threshold as the first threshold when the SNR is below an SNR threshold, wherein the second SNR threshold is lower than the first SNR threshold.

22. The computing system of claim 19, wherein determining the first duration weight factor uses a trained model configured to calculate how much weight to give the second value based on the first value.

23. The computing system of claim 19, wherein:

performing automatic speech recognition processing on the first audio data further comprises calculating a first probability that the first hypothesis corresponds to an utterance represented in the first audio data; and determining the first pause duration value is further based on the first probability.

24. The computing system of claim 19, wherein:
the computer-readable medium is encoded with additional instructions operable to be executed by the at least one processor to further cause the computing system to perform additional actions comprising:
determining that the received audio data corresponding to the at least one utterance further includes second audio data corresponding to a second source direction, the second source direction being different than the first source direction, and
processing the second audio data to determine a second pause duration value; and
wherein determining the endpoint further comprises determining the endpoint based at least in part on the first pause duration value and the second pause duration value.

25. The computing system of claim 24, wherein processing the second audio data to determine the second pause duration value further comprises:
performing automatic speech recognition processing on the second audio data to determine a second hypothesis including one or more of at least one second word or a representation of at least one second word potentially corresponding to the second audio data;
determining that a second portion of the second audio data corresponds to speech;
determining a third value representing a third time duration of the second portion of the second audio data;
determining a second duration weight factor based at least in part on the third value;
determining, in the second hypothesis, a representation of second non-speech, the second non-speech following the second portion of the second audio data;
determining a fourth value representing a fourth time duration corresponding to the second non-speech; and
determining the second pause duration value by using the second duration weight factor to adjust the fourth value.

26. The computing system of claim 25, wherein:
performing automatic speech recognition processing on the first audio data further comprises calculating a first probability that the first hypothesis corresponds to an utterance represented in the first audio data;
determining the first pause duration value further comprises determining the first pause duration value based at least in part on the first probability;
performing automatic speech recognition processing on the second audio data further comprises calculating a second probability that the second hypothesis corresponds to an utterance represented in the second audio data; and
determining the second pause duration value further comprises determining the second pause duration value based at least in part on the second probability.

27. The computing system of claim 25, wherein the computer-readable medium is encoded with additional instructions operable to be executed by the at least one processor to further cause the computing system to:
determine that the first value is greater than the third value; and
based at least in part on determining that the first value is greater than the third value, set the first duration weight factor to be greater than the second duration weight factor.

28. The computing system of claim 25, wherein the computer-readable medium is encoded with additional instructions operable to be executed by the at least one processor to further cause the computing system to:
discard the second audio data in response to the third value being under a threshold.

29. The computing system of claim 19, wherein determining the endpoint further comprises:
determining, based at least in part on the first pause duration value, an expected pause duration value; and
determining that the expected pause duration value has exceeded a threshold.

* * * * *